(12) United States Patent
Rotter et al.

(10) Patent No.: US 11,104,113 B2
(45) Date of Patent: Aug. 31, 2021

(54) SYSTEMS AND METHODS FOR ASSEMBLING ELONGATE COMPOSITE STRUCTURES

(71) Applicant: The Boeing Company, Chicago, IL (US)

(72) Inventors: Daniel M. Rotter, Lake Forest Park, WA (US); Brian Dodgson, Seattle, WA (US); Brad A. Coxon, Everett, WA (US); Gabriel Zane Forston, Lake Stevens, WA (US); Jake Adam Reeves, Newcastle, WA (US); Khanh Mai Pham, Renton, WA (US); Stephen Lee Metschan, Black Diamond, WA (US); Patrick Shephard, Woodinville, WA (US); John Dempsey Morris, Seattle, WA (US); Steven Philip Hansen, Everett, WA (US)

(73) Assignee: The Boeing Company, Chicago, IL (US)

( * ) Notice: Subject to any disclaimer, the term of this patent is extended or adjusted under 35 U.S.C. 154(b) by 595 days.

(21) Appl. No.: 15/491,101

(22) Filed: Apr. 19, 2017

(65) Prior Publication Data

US 2018/0304606 A1 Oct. 25, 2018

(51) Int. Cl.
*B32B 37/10* (2006.01)
*B29C 65/00* (2006.01)
(Continued)

(52) U.S. Cl.
CPC .......... *B32B 37/1018* (2013.01); *B29C 65/02* (2013.01); *B29C 66/00145* (2013.01);
(Continued)

(58) Field of Classification Search
CPC .................................................... B29C 70/44
See application file for complete search history.

(56) References Cited

U.S. PATENT DOCUMENTS 5,015,168 A * 5/1991 Boime ................... B29C 70/42
264/552
8,523,553 B2 9/2013 Martin et al.
(Continued)

FOREIGN PATENT DOCUMENTS

EP 2998090 3/2016

OTHER PUBLICATIONS

European Patent Office, Extended European Search Report for related European Application No. 18155466.8 dated Aug. 22, 2018.

*Primary Examiner* — Christopher T Schatz
(74) *Attorney, Agent, or Firm* — Dascenzo Gates Intellectual Property Law, P.C.

(57) ABSTRACT

Systems and methods for assembling elongate composite structures are disclosed. The systems include a first rigid elongate cure tool defining a first elongate support surface for supporting a first elongate charge of composite material (FEC), a second rigid elongate cure tool defining a second elongate support surface for supporting a second elongate charge of composite material (SEC), and a flexible elongate caul plate. The systems further include a vacuum compaction film, a translation structure, and a vacuum source. Methods according to the present disclosure include positioning a vacuum compaction film, positioning a flexible elongate caul plate, and positioning an FEC. The methods further include positioning an SEC, contacting a region of the FEC with a region of the SEC, sealing the vacuum compaction film, evacuating the enclosed volume to generate an elongate composite assembly, and heating the elongate composite assembly to define the elongate composite structure.

22 Claims, 12 Drawing Sheets

(51) Int. Cl.
  *B29C 65/02* (2006.01)
  *B29C 70/44* (2006.01)
  *B29C 70/46* (2006.01)
  *B32B 5/10* (2006.01)
  *B32B 27/38* (2006.01)
  *B32B 37/00* (2006.01)
  *B32B 37/06* (2006.01)
  B29L 31/30 (2006.01)
  B29K 63/00 (2006.01)
  B29K 105/06 (2006.01)

(52) U.S. Cl.
  CPC ............ *B29C 66/721* (2013.01); *B29C 70/44* (2013.01); *B29C 70/46* (2013.01); *B32B 5/10* (2013.01); *B32B 27/38* (2013.01); *B32B 37/0046* (2013.01); *B32B 37/06* (2013.01); *B29C 66/112* (2013.01); *B29C 66/1122* (2013.01); *B29C 66/131* (2013.01); *B29C 66/41* (2013.01); *B29C 66/45* (2013.01); *B29C 66/524* (2013.01); *B29C 66/636* (2013.01); *B29C 66/7212* (2013.01); *B29C 66/73752* (2013.01); *B29C 66/81455* (2013.01); *B29C 66/8322* (2013.01); *B29K 2063/00* (2013.01); *B29K 2105/06* (2013.01); *B29L 2031/3076* (2013.01); *B29L 2031/3085* (2013.01); *B32B 2305/08* (2013.01); *B32B 2363/00* (2013.01); *B32B 2605/18* (2013.01)

(56) References Cited

U.S. PATENT DOCUMENTS

| | | | |
|---|---|---|---|
| 9,061,472 | B2 | 6/2015 | Modin |
| 9,409,348 | B2 | 8/2016 | Hansen |
| 9,511,520 | B1 | 12/2016 | Encinosa et al. |
| 2006/0231981 | A1* | 10/2006 | Lee .................. B29D 99/0007 264/320 |
| 2012/0204741 | A1* | 8/2012 | Bremmer ............... B29C 70/44 100/102 |
| 2015/0273809 | A1 | 10/2015 | Thomas et al. |
| 2016/0207256 | A1 | 7/2016 | Watson et al. |

* cited by examiner

SYSTEMS AND METHODS FOR ASSEMBLING ELONGATE COMPOSITE STRUCTURES

FIELD

The present disclosure is directed generally to systems and methods for assembling elongate composite structures and more particularly to systems and methods that utilize a vacuum compaction device and an elongate caul plate to compact charges of composite material.

BACKGROUND

Assembly of a composite structure may involve joining two elongate charges of composite material to one another, such as under heat and/or pressure. For example, the assembling may involve locating the two elongate charges of composite material on respective elongate cure tools and urging the elongate cure tools toward one another to compact and bind the charges of composite material to one another.

While such a process may be effective in some circumstances, it may be ineffective in others. As an example, the elongate cure tools may be relatively rigid. As such, the elongate cure tools may not effectively compact the two elongate charges of composite material to one another in regions where a thickness of the two elongate charges of composite material varies. Stated another way, the elongate cure tools may be ineffective at uniformly compacting the two elongate charges of composite material together, especially in regions where a thickness of, or number of plies contained within, a portion of the two elongate charges of composite material that extends between the elongate cure tools varies.

As a size and/or length of the two elongate charges of composite material and/or of the elongate cure tools increases, the compaction uniformity may decrease. Thus, there exists a need for improved systems and methods for assembling elongate composite structures.

SUMMARY

Systems and methods for assembling elongate composite structures are disclosed. Systems according to the present disclosure include a first rigid elongate cure tool defining a first elongate support surface configured to support a first elongate charge of composite material (FEC) and a second rigid elongate cure tool defining a second elongate support surface configured to support a second elongate charge of composite material (SEC). At least a region of the second elongate support surface faces toward a corresponding region of the first elongate support surface. The systems further include a flexible elongate caul plate extending along the first elongate support surface and configured to extend between, and spatially separate, the first elongate support surface and the FEC, as well as a vacuum compaction film at least partially defining an enclosed volume that includes the FEC, the SEC, and the flexible elongate caul plate. A region of the vacuum compaction film extends between, and spatially separates, the flexible elongate caul plate and the first elongate support surface. The systems additionally include a translation structure configured to permit relative translation between the first rigid elongate cure tool and the second rigid elongate cure tool between a first relative orientation, in which the FEC is spaced-apart from the SEC, and a second relative orientation, in which the FEC contacts the SEC. The systems also include a vacuum source configured to apply a vacuum to the enclosed volume.

Methods according to the present disclosure include positioning a vacuum compaction film on a first elongate support surface of a first rigid elongate cure tool, positioning a flexible elongate caul plate on the first elongate support surface such that the vacuum compaction film extends between, and spatially separates, the flexible elongate caul plate and the first elongate support surface, and positioning a first elongate charge of composite material (FEC) on the first elongate support surface such that the vacuum compaction film and the flexible elongate caul plate extend between, and spatially separate, the FEC and the first elongate support surface. The methods further include positioning a second elongate charge of composite material (SEC) on a second elongate support surface of a second rigid elongate cure tool, contacting a region of the FEC with a region of the SEC to define an interface region between the FEC and the SEC, and sealing the vacuum compaction film against at least one of the first elongate support surface and the second elongate support surface to at least partially define an enclosed volume that includes the FEC, the SEC, and the flexible elongate caul plate. The methods additionally include evacuating the enclosed volume to compact the FEC and the SEC, to press the FEC and the SEC against one another, and to generate an elongate composite assembly that includes the FEC, the SEC, the vacuum compaction film, the first elongate cure tool, and the second elongate cure tool. The methods further include heating the elongate composite assembly to cure the FEC and the SEC, to join the FEC to the SEC within the interface region, and to define the elongate composite structure from the FEC and the SEC.

DESCRIPTION

Figure 1:
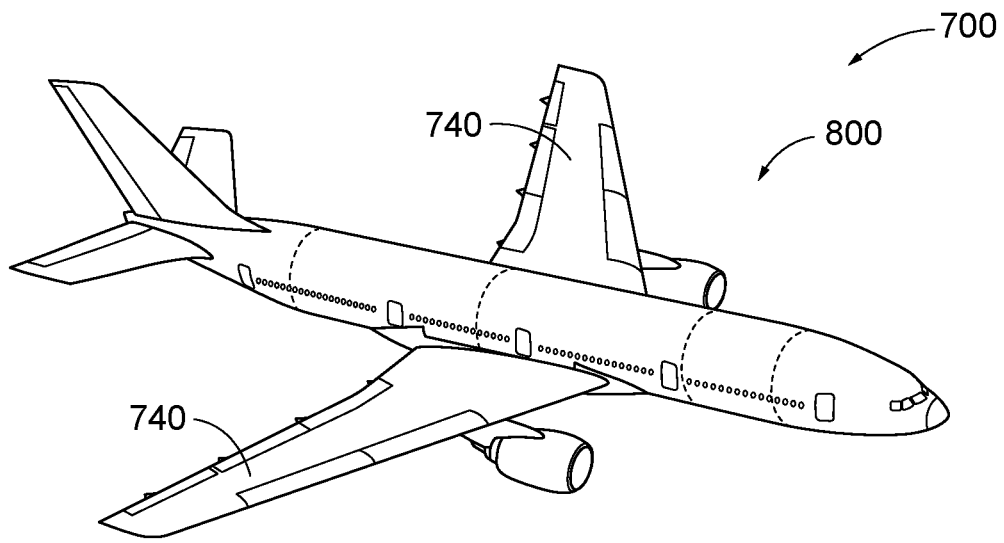
FIG. 1 is a perspective view of an example aircraft that includes a composite structure that may be formed by the systems and methods of the present disclosure.

FIGS. 1-21 provide illustrative, non-exclusive examples of systems 20 and/or methods 200 for assembling an elongate composite structure 800, according to the present disclosure, and/or of aircraft 700 including the elongate composite structure. Elements that serve a similar, or at least substantially similar, purpose are labeled with like numbers in each of FIGS. 1-21, and these elements may not be discussed in detail herein with reference to each of FIGS. 1-21. Similarly, all elements may not be labeled in each of FIGS. 1-21, but reference numerals associated therewith may be utilized herein for consistency. Elements, components, and/or features that are discussed herein with reference to one or more of FIGS. 1-21 may be included in and/or utilized with any of FIGS. 1-21 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
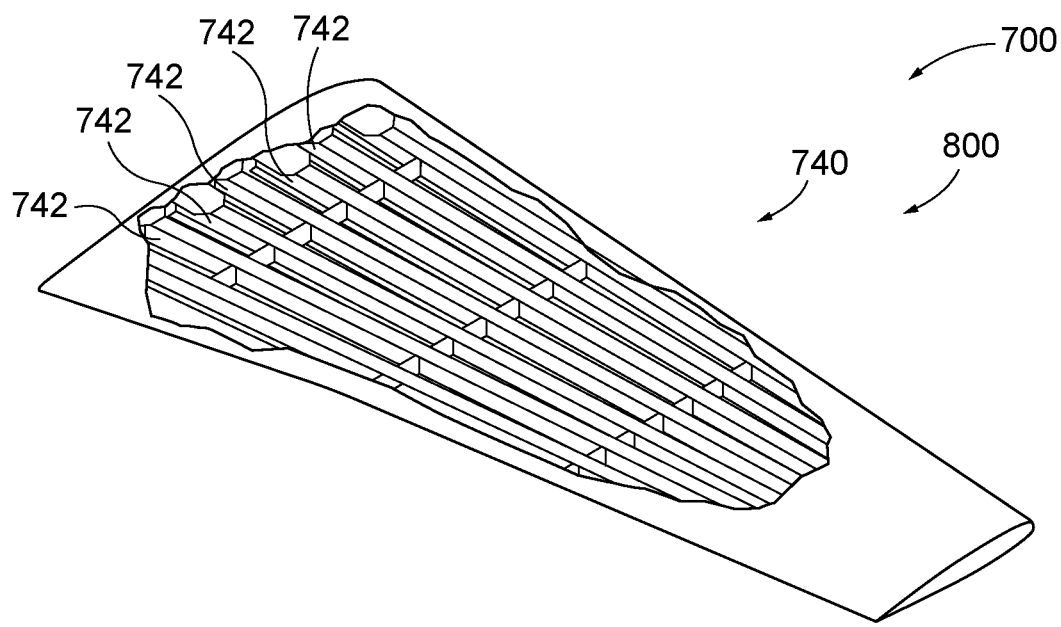
FIG. 2 is a perspective cutaway view of an example wing of the aircraft of FIG. 1.

FIG. 1 illustrates an example of an aircraft 700 that includes an elongate composite structure 800 that may be formed using the systems and methods according to the present disclosure, and FIG. 2 illustrates an example of a wing 740 that may form a portion of aircraft 700 and that includes composite structure 800. For example, and as illustrated in FIG. 2, elongate composite structure 800 may include and/or be a stringer 742 that forms a structural component of wing 740.

Figure 3:
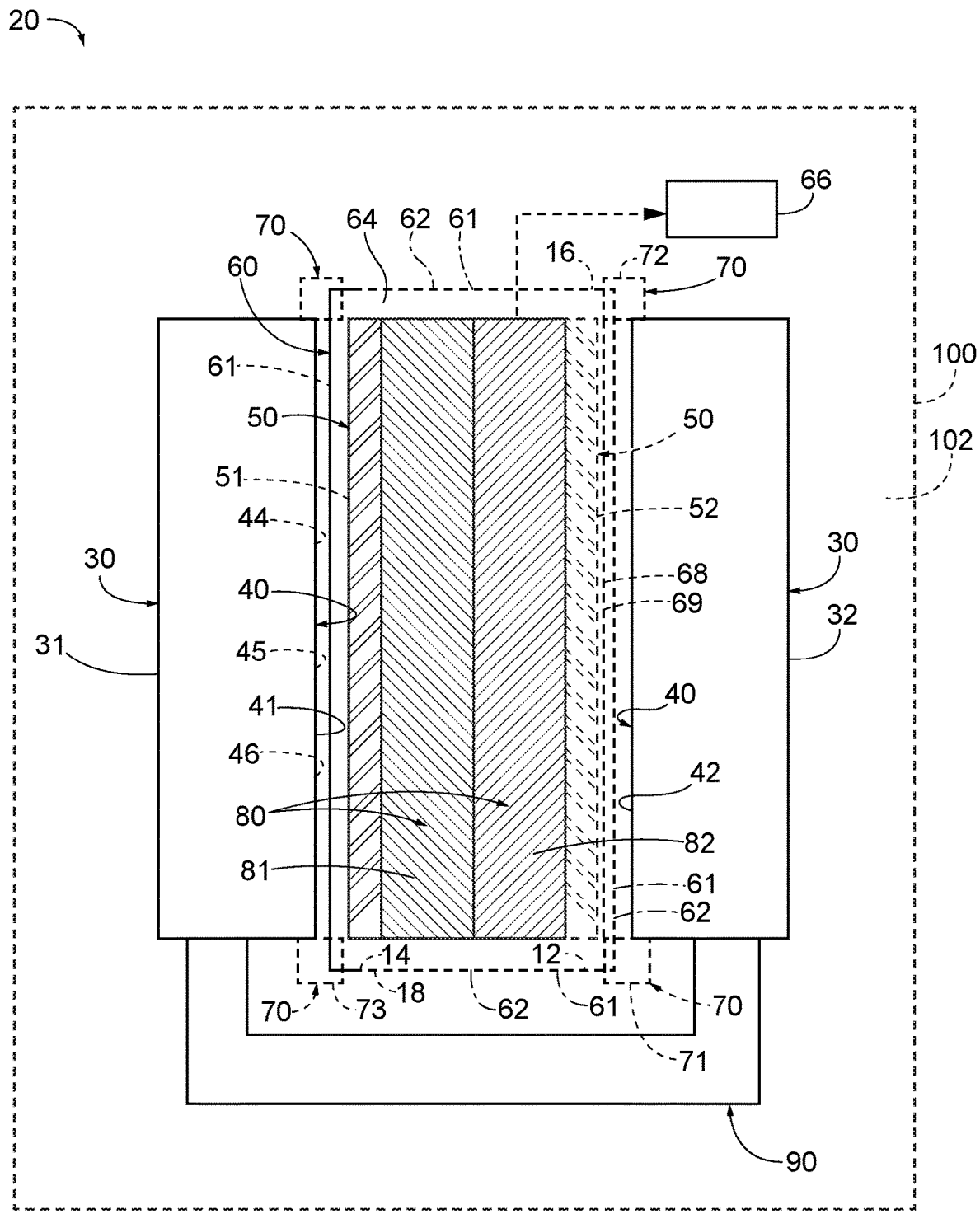
FIG. 3 is a schematic elevation view representing systems for assembling elongate composite structures.
Figure 4:
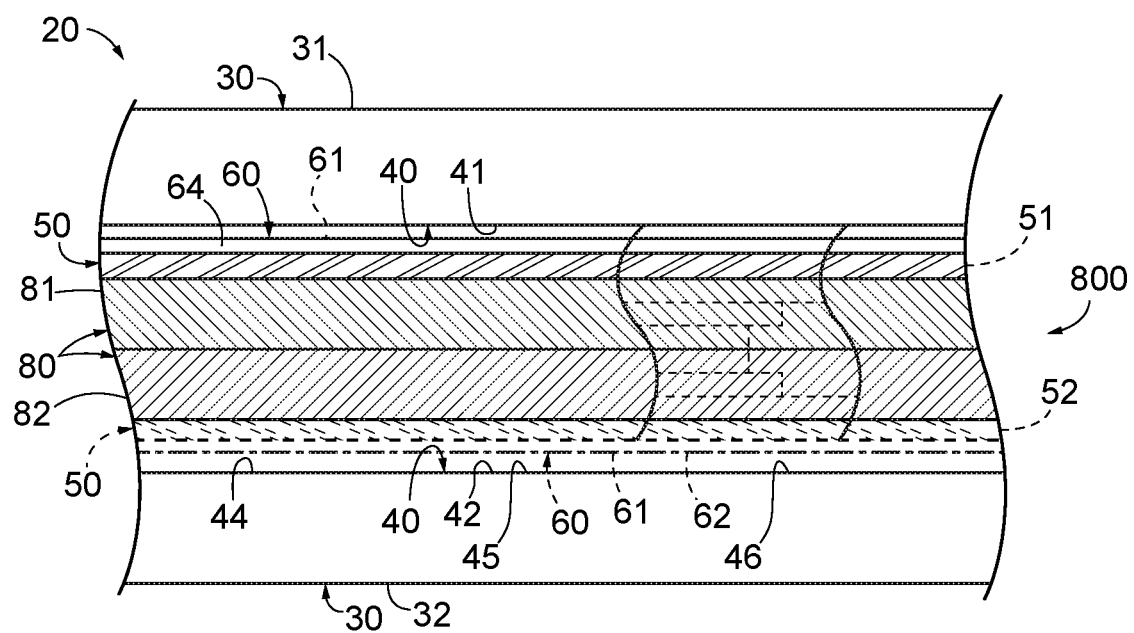
FIG. 4 is a schematic cutaway plan view representing a portion of systems for assembling elongate composite structures.

Turning now to FIGS. 3-4, FIG. 3 illustrates a system 20 for assembling elongate composite structure 800 in elevation view, while FIG. 4 illustrates system 20 as viewed from above. As illustrated in FIGS. 3-4, system 20 includes a plurality of rigid elongate cure tools 30 with a corresponding plurality of elongate support surfaces 40 configured to support a corresponding plurality of elongate charges of composite material 80. More specifically, system 20 includes a first rigid elongate cure tool 31 defining a first elongate support surface 41 configured to support a first elongate charge of composite material 81 and a second rigid elongate cure tool 32 defining a second elongate support surface 42 configured to support a second elongate charge of composite material 82. At least a region of second elongate support surface 42 faces toward a corresponding region of first elongate support surface 41. First elongate charge of composite material 81 also may be referred to as an FEC 81, and/or second elongate charge of composite material 82 also may be referred to as an SEC 82. System 20 may be described as including one or both of FEC 81 and SEC 82.

With continued reference to FIGS. 3-4, system 20 further includes a flexible elongate caul plate 50 extending along first elongate support surface 41 and configured to extend between, and spatially separate, the first elongate support surface and FEC 81. In some embodiments, flexible elongate caul plate 50 is configured to spatially separate an entirety of first elongate support surface 41 from an entirety of FEC 81. Flexible elongate caul plate 50 also may be referred to as a caul plate 50. System 20 also includes a vacuum compaction film 60 at least partially defining an enclosed volume 64 that includes FEC 81, SEC 82, and caul plate 50. Enclosed volume 64 also may be referred to as an internal volume 64. System 20 further includes a vacuum source 66 configured to apply a vacuum to enclosed volume 64. As illustrated in FIG. 3, system 20 further includes a translation structure 90 configured to permit, facilitate, and/or produce relative translation between first rigid elongate cure tool 31 and second rigid elongate cure tool 32. Specifically, translation structure 90 is configured to permit relative translation between a first relative orientation, in which FEC 81 is spaced apart from SEC 82, and a second relative orientation, in which FEC 81 contacts SEC 82. More specifically, translation structure 90 may be configured to permit the relative translation along a translation axis, such as a translation axis that is perpendicular to the region of second elongate support surface 42 that faces the corresponding region of first elongate support surface 41 and/or to the region of the first elongate support surface that faces the corresponding region of the second elongate support surface. This is illustrated in FIGS. 8-19 and discussed in more detail herein with reference thereto.

During operation of system 20, flexible elongate caul plate 50 may extend along and contact elongate charge of composite material 80 to apply a compaction force that is constant, or at least substantially constant, along a length of elongate charge of composite material 80. More specifically, when flexible elongate caul plate 50 is positioned within enclosed volume 64, applying a vacuum to enclosed volume 64 may cause vacuum compaction film 60 to urge flexible elongate caul plate 50 to bend and/or flex to conform to a shape of elongate charge of composite material 80. By contrast, rigid elongate cure tool 30 may have a shape that does not fully conform to a shape of elongate charge of composite material 80 and/or may have a stiffness that restricts it from conforming to a shape of the elongate charge of composite material such that the rigid elongate cure tool cannot produce a consistent compaction force across a length of the elongate charge of composite material. Hence, utilizing at least one flexible elongate caul plate 50 positioned within enclosed volume 64 may facilitate a more uniform and/or robust joining of FEC 81 and SEC 82 relative to prior art systems that lack flexible elongate caul plate 50, that do not position the flexible elongate caul plate within the enclosed volume, and/or that utilize first elongate support surface 41 to partially define the enclosed volume. In some embodiments, system 20 is configured to be utilized in conjunction with a heating assembly 100, such as an oven and/or an autoclave, that defines a heated volume 102 sized to receive the system. In such an embodiment, the heating assembly is configured to heat system 20 via heating of the heated volume so as to cure FEC 81 and SEC 82, thereby joining the FEC to the SEC and defining elongate composite structure 800 from the FEC and the SEC.

Elongate charge of composite material 80 (such as FEC 81 and/or SEC 82) may have any appropriate material and/or conformational construction. For example, in some embodiments, FEC 81 and/or SEC 82 may include a corresponding plurality of plies of composite material, which may include, be, and/or be defined by a plurality of fibers and a resin material. As examples, the plies of composite material may include and/or be pre-impregnated composite fibers, resin-infused fiber structures, and/or thermoplastic fiber reinforced materials. As more specific examples, the resin material may include and/or be a thermoset resin, an epoxy, a thermoset epoxy, an adhesive, a thermoset adhesive, a polymer, and/or a thermoset polymer. As further examples, the plurality of fibers may include and/or be a plurality of carbon fibers, a plurality of polymeric fibers, a plurality of glass fibers, a plurality of organic fibers, a plurality of inorganic fibers, and/or a plurality of metal fibers.

FEC 81 and/or SEC 82 each may be substantially uniform in thickness and/or material composition along a corresponding length thereof. However, this is not required, and it is within the scope of the present disclosure that FEC 81 and/or SEC 82 may have a thickness that varies along the length thereof. For example, and as illustrated in dashed lines in FIG. 4, FEC 81 and/or SEC 82 may include and/or be a stepped composite structure with a number of plies that varies along the length thereof such that the thickness thereof varies along its length.

As discussed, flexible elongate caul plate 50 is configured to extend along and contact elongate charge of composite material 80 to apply a compaction force that is constant, or at least substantially constant, along a length of elongate charge of composite material 80. Specifically, flexible elongate caul plate 50 may be configured to more fully conform to a shape of elongate charge of composite material 80 when compared to rigid elongate cure tool 30.

For example, first rigid elongate cure tool 31 may have a first cure tool stiffness, and/or second rigid elongate cure tool 32 may have a second cure tool stiffness, and the first cure tool stiffness and/or the second cure tool stiffness may be at least a threshold multiple of a caul plate stiffness of flexible elongate caul plate 50. Examples of the threshold multiple include at least 2, at least 4, at least 6, at least 8, at least 10, at least 15, at least 20, at least 40, at least 60, at least 80, at least 100, at least 250, at least 500, and/or at least 1000. In some embodiments, flexible elongate caul plate 50 may not have a constant caul plate stiffness. For example, flexible elongate caul plate 50 may have a stiffness that varies along a length of the caul plate, such as to match a contour of FEC 81 and/or SEC 82 and/or to apply a specific pressure to specific location(s) and/or region(s) along FEC 81 and/or SEC 82. In such an embodiment, the caul plate stiffness may refer to a minimum caul plate stiffness, a maximum caul plate stiffness, and/or an average caul plate stiffness.

Additionally or alternatively, in some embodiments, first rigid elongate cure tool 31 and/or second rigid elongate cure tool 32 may not have a constant cure tool stiffness. For example, the first cure tool stiffness may vary along a length of first rigid elongate cure tool 31, and/or the second cure tool stiffness may vary along a length of second rigid elongate cure tool 32. In such an embodiment, the first cure tool stiffness and/or the second cure tool stiffness may refer to a minimum cure tool stiffness, a maximum cure tool stiffness, and/or an average cure tool stiffness.

In some embodiments, and as schematically illustrated in FIG. 4, first elongate support surface 41 and/or second elongate support surface 42 may define a first planar, or at least substantially planar, region 44, a second planar, or at least substantially planar, region 46, and a support surface transition region 45, which transitions between first planar, or at least substantially planar, region 44 and second planar, or at least substantially planar, region 46. In such an embodiment, flexible elongate caul plate 50 may extend across at least a fraction of first planar, or at least substantially planar, region 44, second planar, or at least substantially planar, region 46, and support surface transition region 45. Stated differently, in an embodiment in which first elongate support surface 41 and/or second elongate support surface 42 is not planar, or at least substantially planar, flexible elongate caul plate 50 may be positioned between the rigid elongate cure tool and elongate charge of composite material 80 to better conform to the elongate charge of composite material.

Additionally or alternatively, elongate charge of composite material 80 may not have a constant thickness along its length. For example, in an embodiment in which FEC 81 and/or SEC 82 has a thickness and/or a number of plies that varies along its length, the FEC and/or the SEC may not receive a consistent compaction force from a prior art rigid elongate cure tool that is not utilized in conjunction with flexible elongate caul plate 50, as disclosed herein.

Flexible elongate caul plate 50 may be formed from any appropriate material, such as a flexible material, a resilient material, a polymeric material, a composite material, and/or the composite material utilized to form and/or define elongate charge of composite material 80. As a more specific example, FEC 81 may be formed from an FEC material, and flexible elongate caul plate 50 may be formed from the FEC material. Additionally or alternatively, flexible elongate caul plate 50 may be formed from a plurality of layered plies of composite material. In such an embodiment, flexible elongate caul plate 50 may be formed from any appropriate number of layered plies of composite material, examples of which include at least 2, at least 3, at least 4, at least 5, at least 6, at least 8, at least 10, at most 20, at most 18, at most 16, at most 14, at most 12, at most 10, at most 8, and/or at most 6 layered plies of composite material.

Vacuum compaction film 60 may include and/or be any appropriate film and/or material appropriate for drawing a vacuum therein, examples of which include a polymeric film, a polymeric sheet, a nylon sheet, a flexible material, a compliant material, a vacuum bag, a fluid-impermeable material, and/or an at least substantially fluid-impermeable material. Vacuum source 66 may include and/or be any appropriate apparatus for evacuating enclosed volume 64, examples of which include a vacuum pump, a blower, and/or a vacuum blower. As illustrated in FIGS. 3-4, a region of vacuum compaction film 60 extends between, and spatially separates, caul plate 50 and first elongate support surface 41.

In some embodiments, system 20 further may include a breather film 68 and/or a release film 69 extending between, and spatially separating, vacuum compaction film 60 and FEC 81, SEC 82, and/or flexible elongate caul plate 50. As used herein, release film 69 also may be referred to as a peel ply 69. As examples, breather film 68 may include and/or be a porous breather film, a woven breather film, a polyester breather film, and/or a vacuum distributing breather film. As further examples, release film 69 may include and/or be a porous release film, a low surface energy release film, and/or a perfluoro tetrafluoroethylene (PTFE) release film. In an embodiment that includes both the breather film and the release film, the release film may extend between, and spatially separate, the breather film and FEC 81, SEC 82, and/or flexible elongate caul plate 50. Additionally or alternatively, vacuum compaction film 60 may include a coating configured to facilitate removal of vacuum compaction film 60 from FEC 81, SEC 82, and/or flexible elongate caul plate 50.

As illustrated in FIG. 3, system 20 may include at least one sealing structure 70 for forming a fluid seal between vacuum compaction film 60 and another component of system 20. For example, sealing structure 70 may be utilized to form the fluid seal between vacuum compaction film 60 and first rigid elongate cure tool 31 and/or second rigid elongate cure tool 32. It is within the scope of the present disclosure that system 20 may include any suitable number of sealing structures 70. As an example, and in some embodiments, system 20 may include a first sealing structure 71 that operatively attaches, and forms a fluid seal between, a first edge 12 of vacuum compaction film 60 and second rigid elongate cure tool 32, and a second sealing structure 72 that operatively attaches, and forms a fluid seal between, a second edge 14 of the vacuum compaction film and the second rigid elongate cure tool. Each sealing structure 70 may include and/or be any appropriate structure and/or material for forming a fluid seal, examples of which include an adhesive, a tape, an adhesive tape, a removable adhesive, a sealant tape, and a gel.

As used herein, first edge 12 and second edge 14 of vacuum compaction film 60 may (respectively) refer to any appropriate portions of the vacuum compaction film. For example, first edge 12 of vacuum compaction film 60 may be opposed to second edge 14 of the vacuum compaction film. Stated differently, first edge 12 and second edge 14 of vacuum compaction film 60 may be located on or near opposite sides and/or edges of the vacuum compaction film. As another example, first edge 12 and/or second edge 14 generally refer to portions of vacuum compaction film 60 that are at, or near, an edge of the vacuum compaction film. However, this is not required, and it is additionally within the scope of the present disclosure that first edge 12 and/or second edge 14 of vacuum compaction film 60 may respectively refer to portions of the vacuum compaction film that are not proximal to an edge of the vacuum compaction film. In such an embodiment, vacuum compaction film 60 may be described as being oversized and/or larger than necessary for the compaction of elongate composite structure 800.

As schematically illustrated in FIGS. 3-4, system 20 may include a plurality of vacuum compaction films 60. For example, in some embodiments, system 20 includes a first vacuum compaction film 61 and a second vacuum compaction film 62. In such an embodiment, system 20 may include sealing structures 70 that seal each vacuum compaction film 60 to first rigid elongate cure tool 31 and/or to second rigid elongate cure tool 32. For example, system 20 may include first sealing structure 71 that operatively attaches, and forms a fluid seal between, first edge 12 of first vacuum compaction film 61 and second rigid elongate cure tool 32, and further may include second sealing structure 72 that operatively attaches, and forms a fluid seal between, a first edge 16 of second vacuum compaction film 62 and the second rigid elongate cure tool. Such an embodiment still further may include a third sealing structure 73 that operatively attaches, and forms a fluid seal between, second edge 14 of first vacuum compaction film 61, a second edge 18 of second vacuum compaction film 62, and/or second rigid elongate cure tool 32. In such an embodiment, second elongate support surface 42, first vacuum compaction film 61, and second vacuum compaction film 62 may be described as collectively forming and/or defining enclosed volume 64.

As schematically illustrated in FIGS. 3-4, system 20 may include a plurality of flexible elongate caul plates 50. For example, flexible elongate caul plate 50 that extends along first elongate support surface 41 may be a first flexible elongate caul plate 51, and system 20 further may include a second flexible elongate caul plate 52 extending along second elongate support surface 42 and configured to extend between, and spatially separate, the second elongate support surface and SEC 82. In some embodiments of systems 20 that include second flexible elongate caul plate 52, the region of vacuum compaction film 60 that extends between, and spatially separates, first flexible elongate caul plate 51 and first elongate support surface 41 is a first region of the vacuum compaction film, and the vacuum compaction film further may include a second region that extends between, and spatially separates, second flexible elongate caul plate 52 and second elongate support surface 42. In other embodiments of system 20 that include second flexible elongate caul plate 52, vacuum compaction film 60 may not include a region that extends between, and spatially separates, the second flexible elongate caul plate and second elongate support surface 42. In such embodiments, second flexible elongate caul plate 52 may be referred to as a spacer caul and/or a shim caul, and/or may be positioned within enclosed volume 64.

In an embodiment of system 20 that includes first flexible elongate caul plate 51 and second flexible elongate caul plate 52, sealing structure 70 may operatively attach, and form a fluid seal between, one of first rigid elongate cure tool 31 and second rigid elongate cure tool 32 and each of first edge 12 and second edge 14 of vacuum compaction film 60. Stated differently, vacuum compaction film 60 may extend between first elongate support surface 41 and first flexible elongate caul plate 51 and between second elongate support surface 42 and second flexible elongate caul plate 52, thereby enclosing each of FEC 81, SEC 82, first flexible elongate caul plate 51, and second flexible elongate caul plate 52 and forming a fluid seal with either of first rigid elongate cure tool 31 and second rigid elongate cure tool 32 via sealing structure 70. Hence, vacuum compaction film 60 may completely, or at least substantially completely, define enclosed volume 64.

It is additionally within the scope of the present disclosure that, in an embodiment of system 20 that includes first flexible elongate caul plate 51 and second flexible elongate caul plate 52, system 20 includes first vacuum compaction film 61 and second vacuum compaction film 62. In such an embodiment, system 20 may include first sealing structure 71 that operatively attaches, and forms a fluid seal between, first rigid elongate cure tool 31 and both first edge 12 of first vacuum compaction film 61 and first edge 16 of second vacuum compaction film 62. In this embodiment, system 20 may further include second sealing structure 72 that operatively attaches, and forms a fluid seal between, second elongate cure tool 32 and both second edge 14 of first vacuum compaction film 61 and second edge 18 of second vacuum compaction film 62. Stated differently, first vacuum compaction film 61 may extend between first elongate support surface 41 and first flexible elongate caul plate 51 and also between second elongate support surface 42 and second flexible elongate caul plate 52. In addition, second vacuum compaction film 62 may be sealed to both first rigid elongate cure tool 31 and second rigid elongate cure tool 32 such that the first vacuum compaction film and the second vacuum compaction film collectively define enclosed volume 64.

Figure 5:
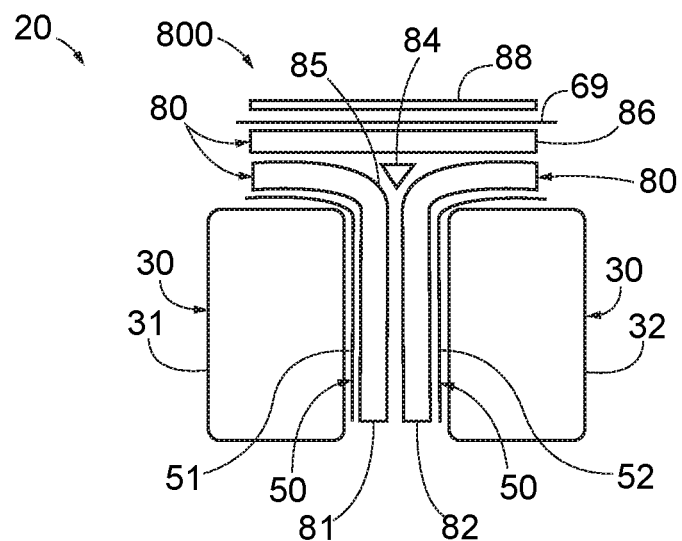
FIG. 5 is a schematic elevation view representing a portion of a system for assembling elongate composite structures.
Figure 6:
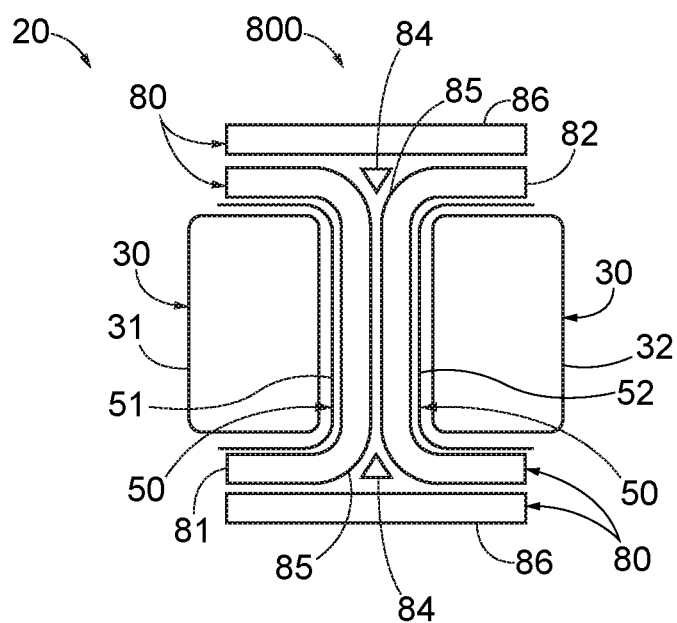
FIG. 6 is a schematic elevation view representing a portion of a system for assembling elongate composite structures.

FIGS. 5-6 schematically illustrate examples of configurations of systems 20, of rigid elongate cure tools 30, of flexible elongate caul plates 50, and/or of elongate charges of composite material 80 that are within the scope of the present disclosure. For example, and as illustrated in FIG. 5, FEC 81 may extend across two faces of first rigid elongate cure tool 31, and/or SEC 82 may extend across two faces of second rigid elongate cure tool 32. Alternatively, and as illustrated in FIG. 6, FEC 81 may extend across three faces of first rigid elongate cure tool 31, and/or SEC 82 may extend across three faces of second rigid elongate cure tool 32. In each case, each flexible elongate caul plate 50 generally extends between each corresponding rigid elongate cure tool 30 and the corresponding elongate charge of composite material 80. As further illustrated in FIGS. 5-6, FEC 81 and SEC 82 may define one or more arcuate transition regions 85 therebetween, and elongate composite structure 800 may further include a radius filler 84 positioned within each of one or more of arcuate transition regions 85. Additionally or alternatively, FEC 81 and SEC 82 together may define one or more exposed surfaces, and elongate composite structure 800 may include a base charge 86 positioned on each of one or more of the exposed surfaces. Radius filler 84 and/or base charge 86, when present, may be examples of elongate charges of composite material 80, and may be formed from the same material as either or both of FEC 81 and SEC 82. As further illustrated in FIG. 5, system 20 also may include peel ply 69 positioned on base charge 86, and may include a peel ply caul plate 88 positioned on peel ply 69. Peel ply caul plate 88 may include and/or be any appropriate material for applying a constant, or at least substantially constant, compaction force to peel ply 69 and/or base charge 86. For example, peel ply caul plate 88 may have a peel ply caul plate stiffness that is greater than, less than, substantially equal to, or equal to the caul plate stiffness of first flexible elongate caul plate 51 and/or of second flexible elongate caul plate 52.

Figure 7:
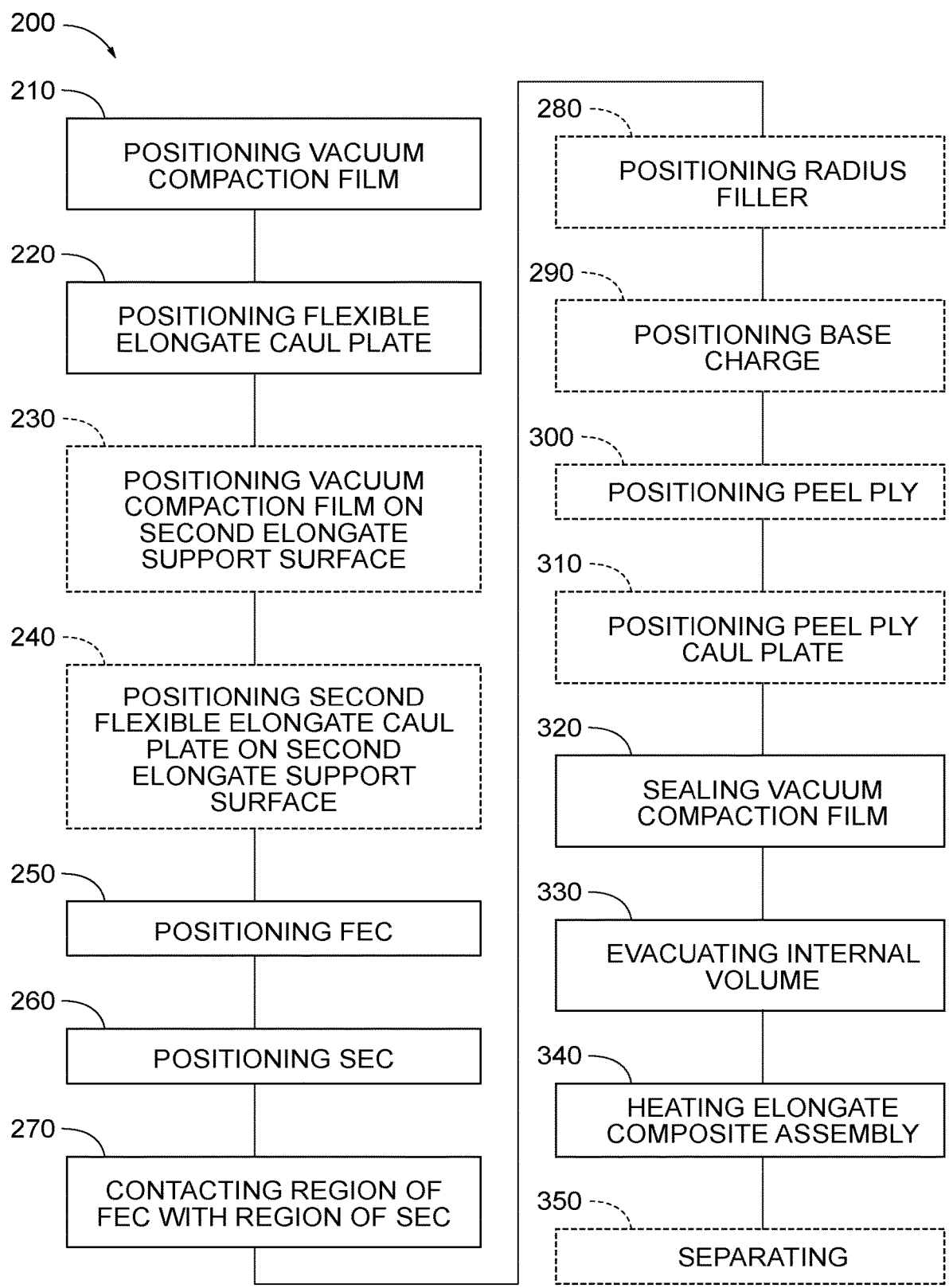
FIG. 7 is a flowchart schematically representing methods of assembling elongate composite structures.
Figure 20:
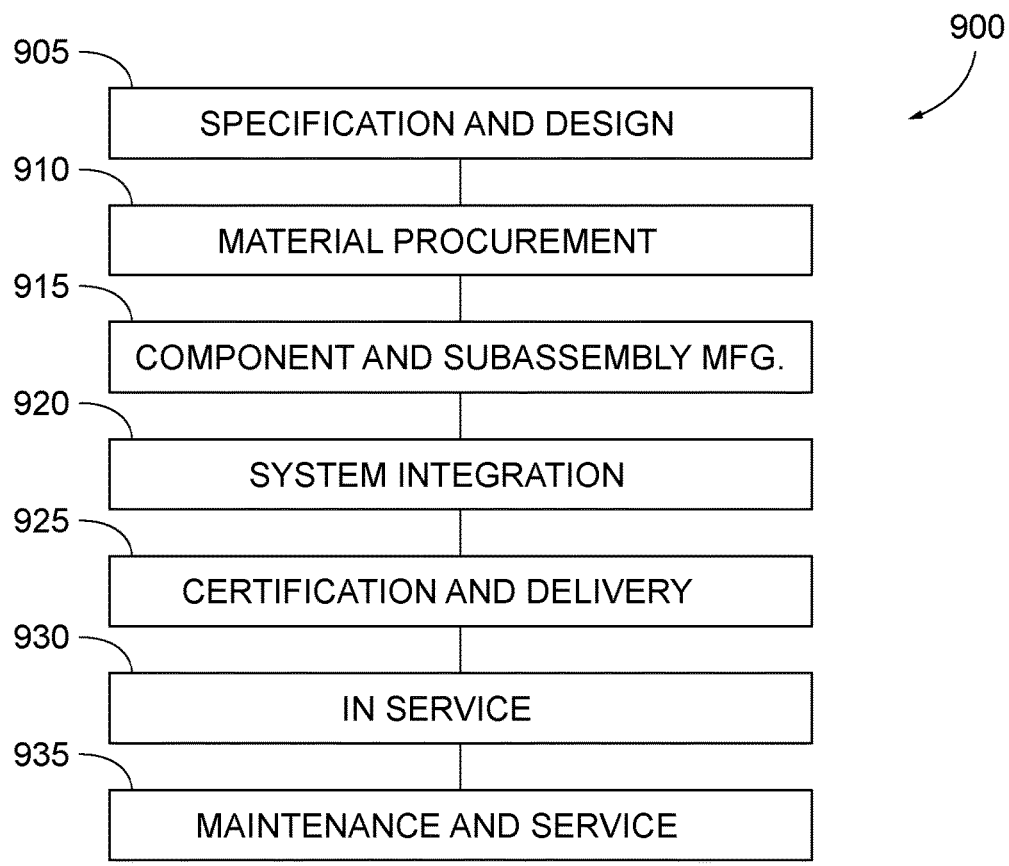
FIG. 20 is a flowchart schematically representing aircraft production and service methodology.

FIGS. 7 and 20 schematically provide flowcharts that represent illustrative, non-exclusive examples of methods according to the present disclosure. In FIGS. 7 and 20, some steps are illustrated in dashed boxes indicating that such steps may be optional or may correspond to an optional version of methods according to the present disclosure. That said, not all methods according to the present disclosure are required to include the steps illustrated in solid boxes. The methods and steps illustrated in FIGS. 7 and 20 are not limiting and other methods and steps are within the scope of the present disclosure, including methods having greater than or fewer than the number of steps illustrated, as understood from the discussions herein.

FIG. 7 provides a flowchart of methods 200 of assembling an elongate composite structure, and FIGS. 8-19 schematically illustrate portions and/or steps of methods 200. FIGS. 8-19 illustrate configurations in which flexible elongate charges 81 and 82 contact only a single face of corresponding rigid elongate cure tools 30. However, it is within the scope of the present disclosure that methods 200 of FIGS. 7-19 may include, utilize, and/or be utilized to assemble elongate composite structures that contact two, three, or more faces of corresponding rigid elongate cure tools 30. Examples of such elongate composite structures are illustrated in FIGS. 5-6 and discussed herein with reference thereto.

Figure 8:
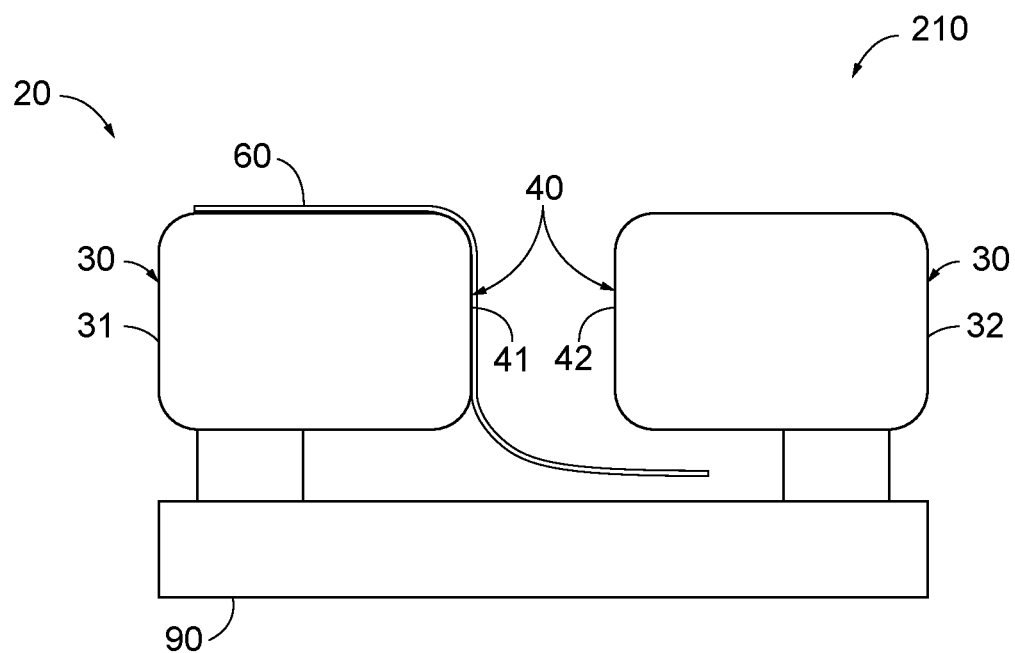
FIG. 8 is a schematic elevation view representing a portion of a system for assembling elongate composite structures during assembly of an elongate composite structure.
Figure 9:
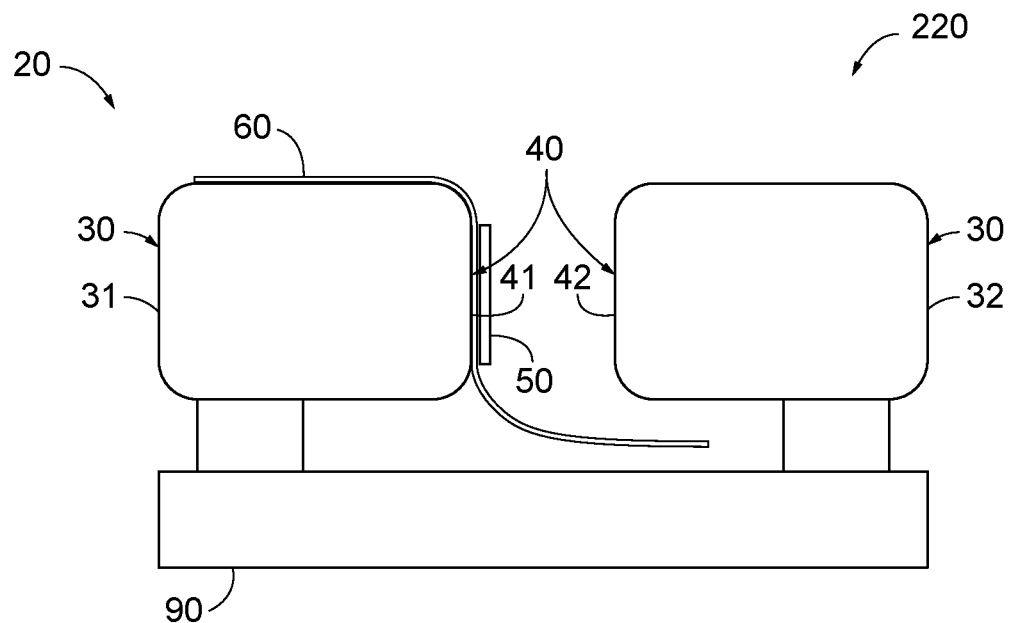
FIG. 9 is a schematic elevation view representing a portion of the system of FIG. 8 during assembly of the elongate composite structure.

As seen in FIG. 7, methods 200 of assembling an elongate composite structure (such as elongate composite structure 800) include positioning at 210 a vacuum compaction film (such as vacuum compaction film 60) on a first elongate support surface of a first rigid elongate cure tool (such as first elongate support surface 41 of first rigid elongate cure tool 31), and positioning at 220 a flexible elongate caul plate (such as flexible elongate caul plate 50) on the first elongate support surface such that the vacuum compaction film extends between, and spatially separates, the flexible elongate caul plate and the first elongate support surface. As an example, FIG. 8 schematically illustrates the positioning at 210, with vacuum compaction film 60 being illustrated on first elongate support surface 41 of first rigid elongate cure tool 31, and FIG. 9 schematically illustrates the positioning at 220, with flexible elongate caul plate 50 being illustrated on the first elongate support surface.

Figure 10:
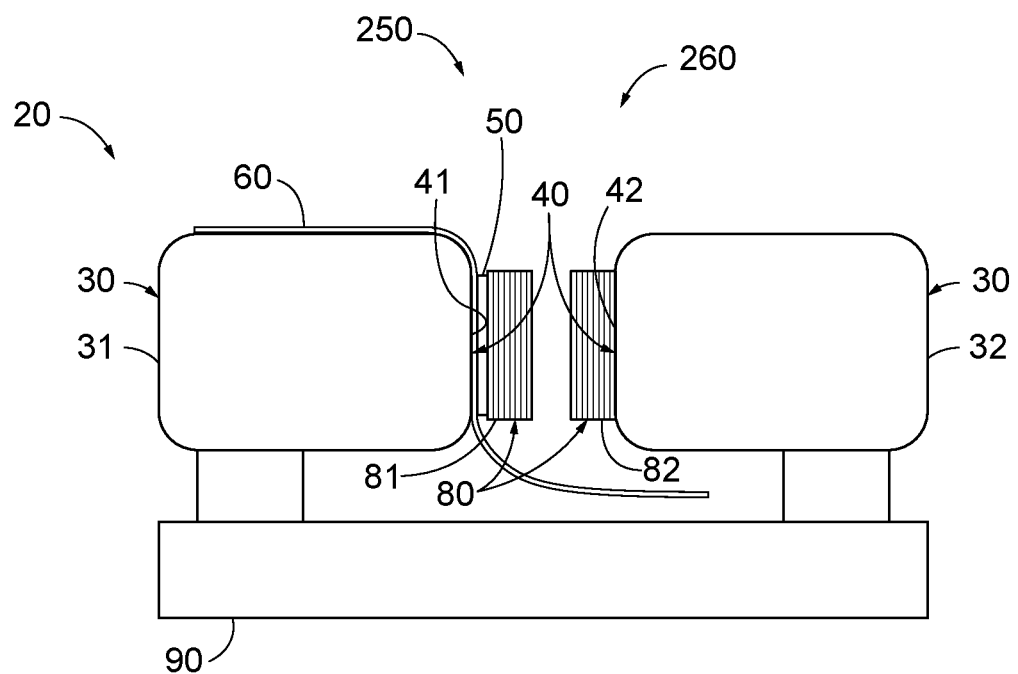
FIG. 10 is a schematic elevation view representing a portion of the system of FIG. 8 during assembly of the elongate composite structure.
Figure 11:
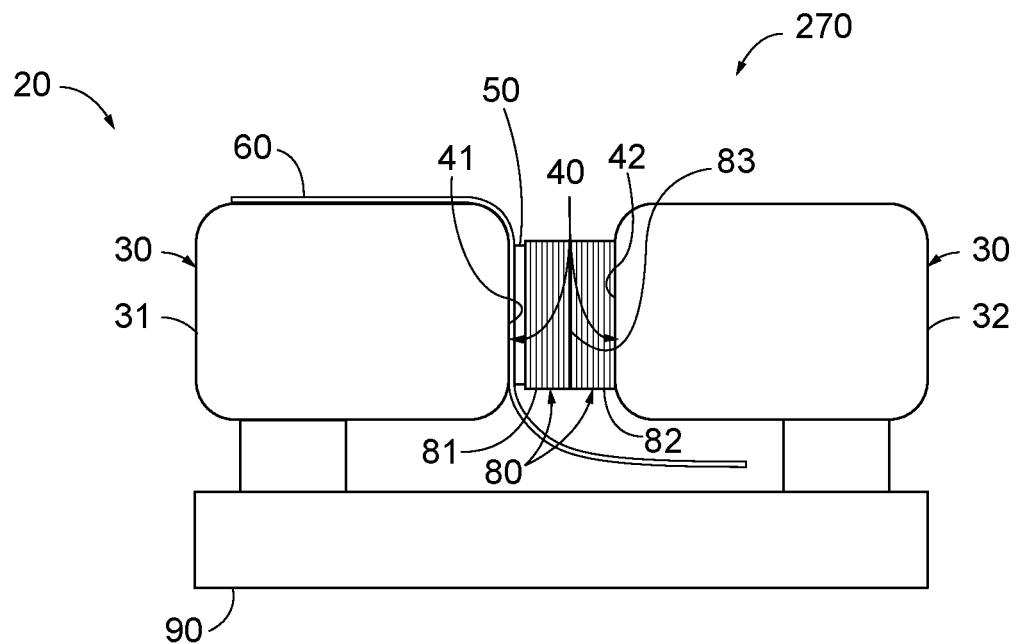
FIG. 11 is a schematic elevation view representing a portion of the system of FIG. 8 during assembly of the elongate composite structure.

Methods 200 further include positioning at 250 a first elongate charge (FEC) of composite material (such as FEC 81) on the first elongate support surface such that the vacuum compaction film and the flexible elongate caul plate extend between, and spatially separate, the FEC and the first elongate support surface. Methods 200 also include positioning at 260 a second elongate charge (SEC) of composite material (such as SEC 82) on a second elongate support surface of a second rigid elongate cure tool (such as second elongate support surface 42 of second rigid elongate cure tool 32). FIG. 10 schematically illustrates the positioning at 250 of FEC 81 on first elongate support surface 41 and the positioning at 260 of SEC 82 on second elongate support surface 42 of second rigid elongate cure tool 32. As indicated in FIG. 7, and as schematically illustrated in FIG. 11, methods 200 further include contacting at 270 a region of the FEC with a region of the SEC to define an interface region 83 between the FEC and the SEC.

In some embodiments, the contacting at 270 may result in the FEC and the SEC defining an arcuate transition region therebetween. In such an embodiment, methods 200 may include, subsequent to the contacting at 270 and prior to the sealing at 320, positioning at 280 a radius filler (such as radius filler 84) within the arcuate transition region. Additionally or alternatively, subsequent to the contacting at 270, the FEC and the SEC together may define an exposed surface, and methods 200 may include, prior to the sealing at 320, positioning at 290 a base charge (such as base charge 86) on the exposed surface. Examples of systems 20 that include radius filler 84 and/or base charge 86 are illustrated in FIGS. 5-6. With continued reference to FIG. 7, in an embodiment of methods 200 that includes the positioning at 290 the base charge, the methods also may include positioning at 300 a peel ply (such as peel ply 69) on the base charge, and further may include, subsequent to the positioning at 300, positioning at 310 a peel ply caul plate (such as peel ply caul plate 88) on peel ply 69.

Methods 200 further include sealing at 320 the vacuum compaction film against at least one of the first elongate support surface and the second elongate support surface to at least partially define an enclosed volume (such as enclosed volume 64) that includes the FEC, the SEC, and the flexible elongate caul plate. Methods 200 subsequently include evacuating at 330 enclosed volume 64 to compact the FEC and the SEC. More specifically, the evacuating at 330 may include pressing the FEC and the SEC against one another, thereby generating an elongate composite assembly that includes the FEC, the SEC, the vacuum compaction film, the first elongate cure tool, and the second elongate cure tool.

Methods 200 further include heating at 340 the elongate composite assembly to cure the FEC and the SEC, to join the FEC to the SEC within the interface region, and/or to define the elongate composite structure from the FEC and the SEC. Methods 200 additionally may include, subsequent to the heating at 340, separating at 350 the first rigid elongate cure tool, the second rigid elongate cure tool, and the vacuum compaction film from the elongate composite structure.

Figure 12:
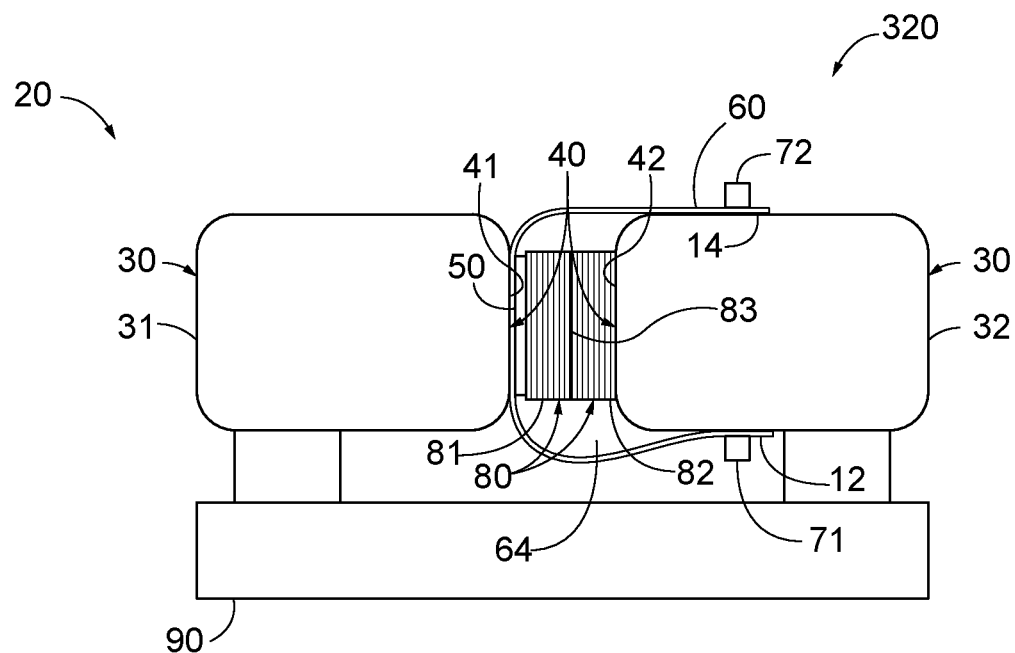
FIG. 12 is a schematic elevation view representing a portion of the system of FIG. 8 during assembly of the elongate composite structure.

The sealing at 320 may be performed in any appropriate manner. For example, and as schematically illustrated in FIG. 12, the sealing at 320 may include sealing first edge 12 of vacuum compaction film 60 against second rigid elongate cure tool 32 (such as with first sealing structure 71) and sealing second edge 14 of the vacuum compaction film against the second rigid elongate cure tool (such as with second sealing structure 72). In such an embodiment, the vacuum compaction film and the second elongate support surface together define enclosed volume 64.

Figure 13:
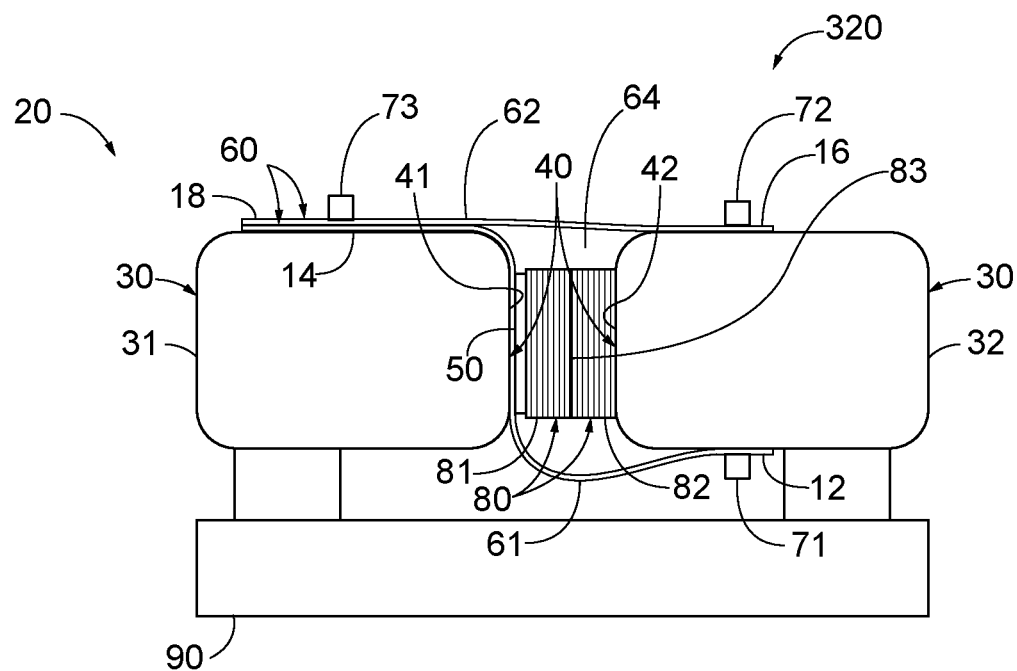
FIG. 13 is a schematic elevation view representing a portion of the system of FIG. 8 during assembly of the elongate composite structure.

However, this is not required, and it is additionally within the scope of the present disclosure that the sealing 320 include utilizing a plurality of vacuum compaction films. For example, and as schematically illustrated in FIG. 13, system 20 may include a first vacuum compaction film (such as first vacuum compaction film 61) and a second vacuum compaction film (such as second vacuum compaction film 62). In such an embodiment, the sealing at 320 may include sealing first edge 12 of the first vacuum compaction film against second rigid elongate cure tool 32 (such as with first sealing structure 71), sealing second edge 14 of the first vacuum compaction film against first rigid elongate cure tool 31 (such as with third sealing structure 73), sealing first edge 16 of the second vacuum compaction film against the second rigid elongate cure tool (such as with second sealing structure 72), and sealing second edge 18 of the second vacuum compaction film against the first rigid elongate cure tool (such as with the third sealing structure). In such an embodiment, the first vacuum compaction film, the second vacuum compaction film, and the second elongate support surface together define enclosed volume 64.

FIGS. 8-13 generally illustrate steps of methods 200 performed in a system 20 that includes a single flexible elongate caul plate 50. However, this is not required, and it is additionally within the scope of the present disclosure that methods 200 be performed in a system that includes a plurality of elongate flexible caul plates. As an example, FIGS. 14-19 generally illustrate steps of methods 200 performed in a system 20 that includes a first flexible elongate caul plate 51 and a second flexible elongate caul plate 52. However, it is within the scope of the present disclosure that first flexible elongate caul plate 51 or second flexible elongate caul plate 52 may be omitted from the steps of methods 200, such as are illustrated in FIGS. 14-19, without departing from the scope of the present disclosure.

Figure 14:
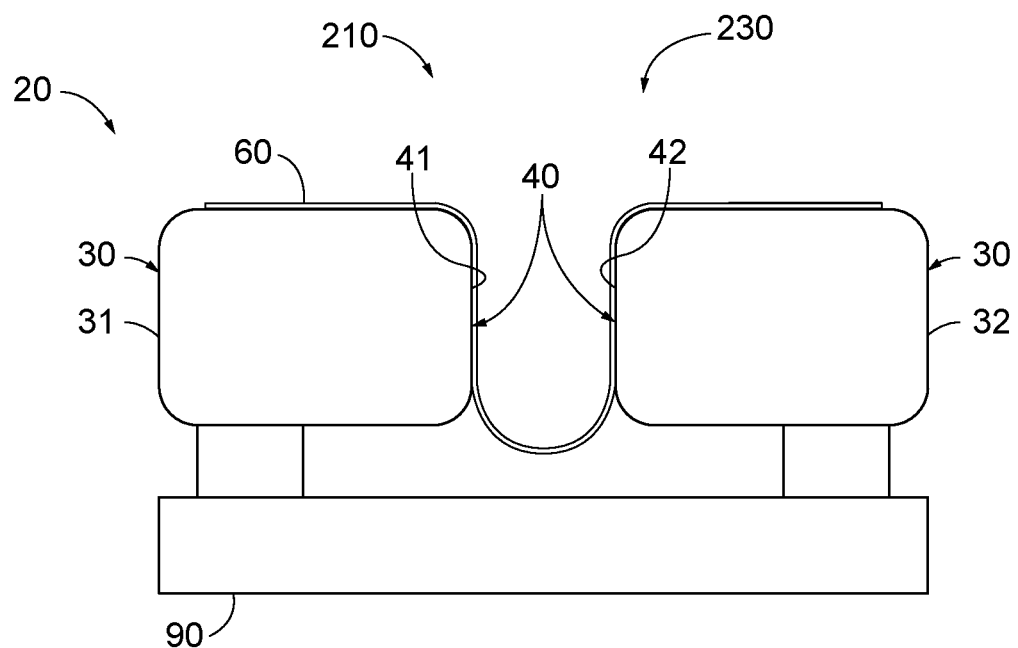
FIG. 14 is a schematic elevation view representing a portion of a system for assembling elongate composite structures during assembly of a elongate composite structure.
Figure 15:
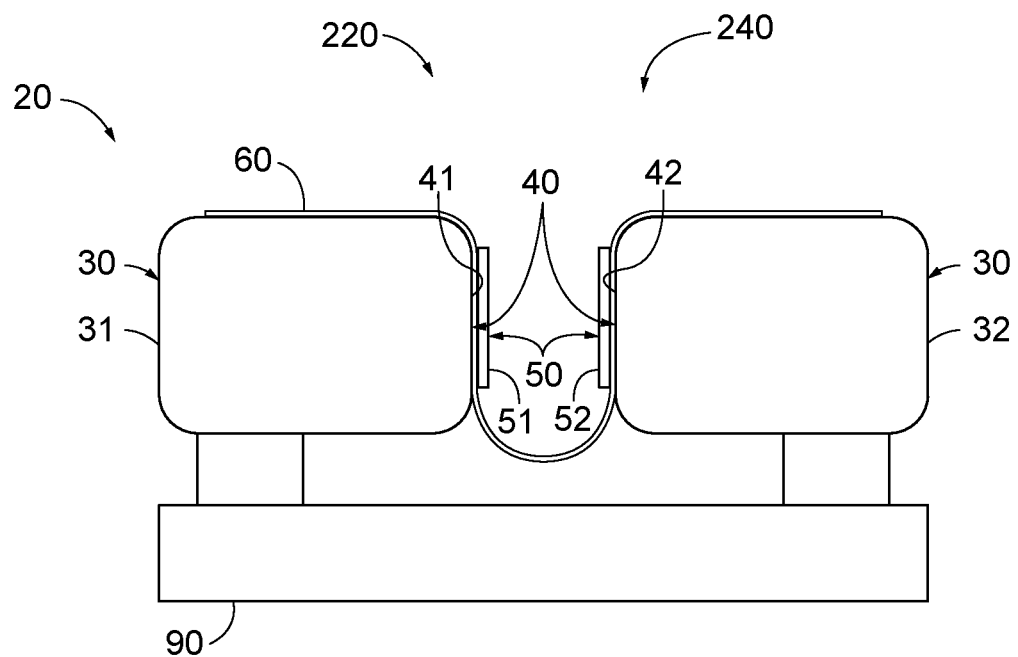
FIG. 15 is a schematic elevation view representing a portion of the system of FIG. 14 during assembly of the elongate composite structure.
Figure 16:
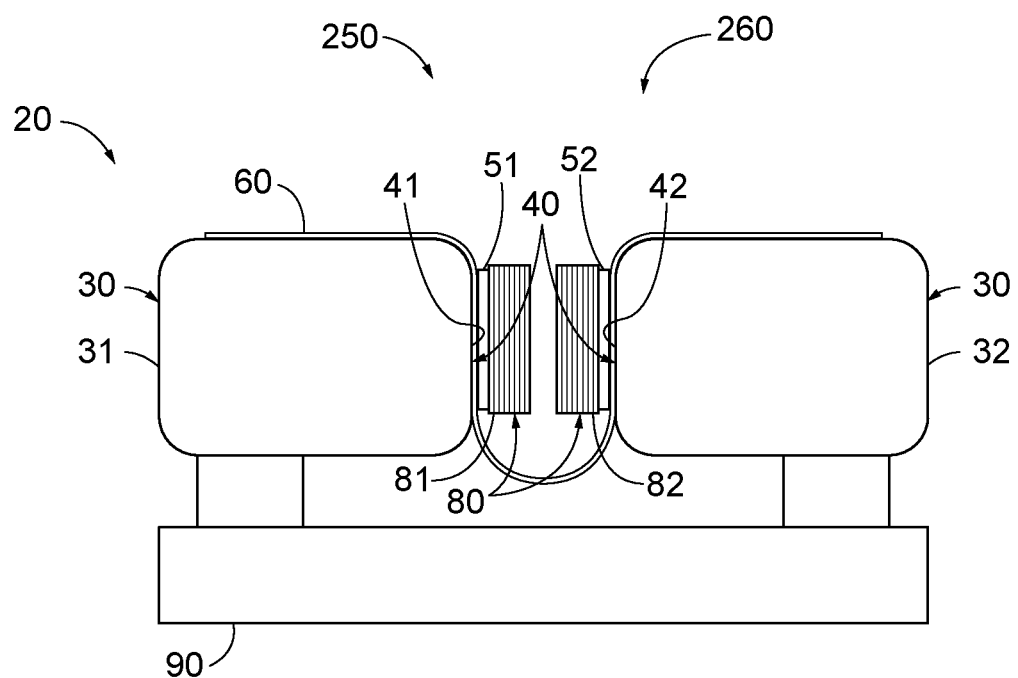
FIG. 16 is a schematic elevation view representing a portion of the system of FIG. 14 during assembly of the elongate composite structure.
Figure 17:
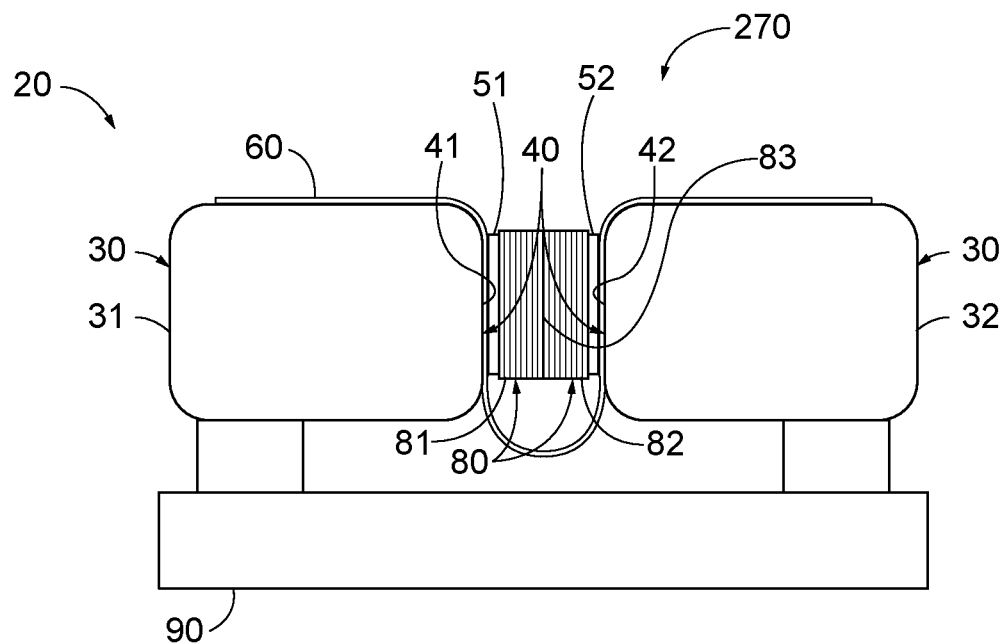
FIG. 17 is a schematic elevation view representing a portion of the system of FIG. 14 during assembly of the elongate composite structure.

Specifically, and with continued reference to FIG. 7, methods 200 may include, prior to the positioning at 260 the SEC, positioning at 230 of the vacuum compaction film on the second elongate support surface and positioning at 240 of the second flexible elongate caul plate on the second elongate support surface such that the second vacuum compaction film extends between, and spatially separates, the second flexible elongate caul plate and the second elongate support surface. As an example, FIG. 14 schematically illustrates the positioning at 210 of vacuum compaction film 60 on first elongate support surface 41 and the positioning at 230 of vacuum compaction film 60 on second elongate support surface 42. FIG. 15 schematically illustrates the positioning at 220 of first elongate caul plate 51 and the positioning at 240 of second elongate caul plate 52. In such an embodiment, and as schematically illustrated in FIG. 16, the positioning at 260 of SEC 82 includes positioning the SEC such that both vacuum compaction film 60 and second elongate caul plate 52 extend between, and spatially separate, the SEC and second elongate support surface 42. FIG. 17 schematically illustrates the contacting at 270 a region of FEC 81 with a region of SEC 82 to define interface region 83.

Figure 18:
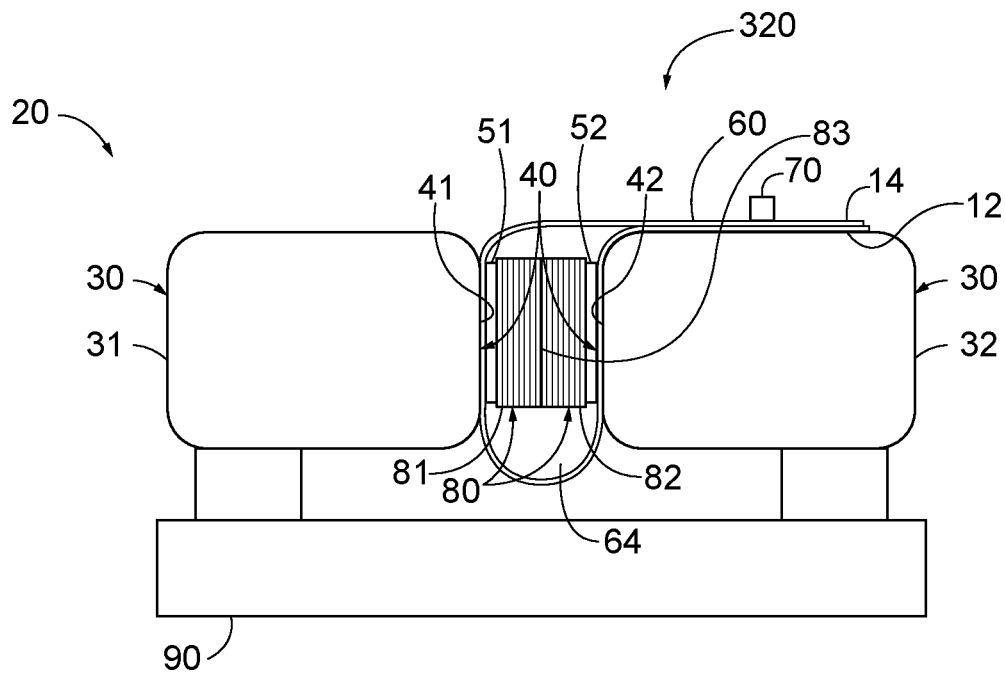
FIG. 18 is a schematic elevation view representing a portion of the system of FIG. 14 during assembly of the elongate composite structure.

In an embodiment of methods 200 that includes utilizing two flexible elongate caul plates, the sealing at 320 may be performed in any appropriate manner. As an example, and as schematically illustrated in FIG. 18, the sealing 320 may include sealing both first edge 12 second edge 14 of vacuum compaction film 60 against either first elongate support surface 41 or second elongate support surface 42.

Figure 19:
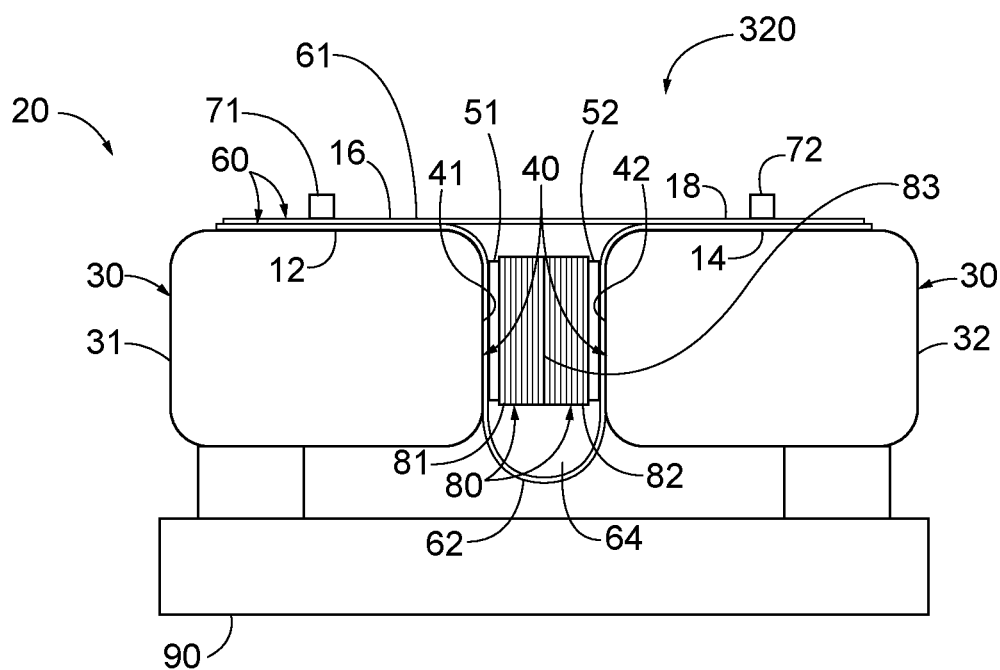
FIG. 19 is a schematic elevation view representing a portion of the system of FIG. 14 during assembly of the elongate composite structure.

Alternatively, an embodiment of methods 200 may include utilizing two flexible elongate caul plates and two vacuum compaction films. As an example, and as schematically illustrated in FIG. 19, the sealing at 320 may include sealing first edge 12 of first vacuum compaction film 61 and first edge 16 of second vacuum compaction film 62 against first elongate support surface 41 (such as with first sealing structure 71) and sealing second edge 14 of the first vacuum compaction film and second edge 18 of the second vacuum compaction film against second elongate support surface 42 (such as with second sealing structure 72). In such an embodiment, the first vacuum compaction film and the second vacuum compaction film together define enclosed volume 64.

Figure 21:
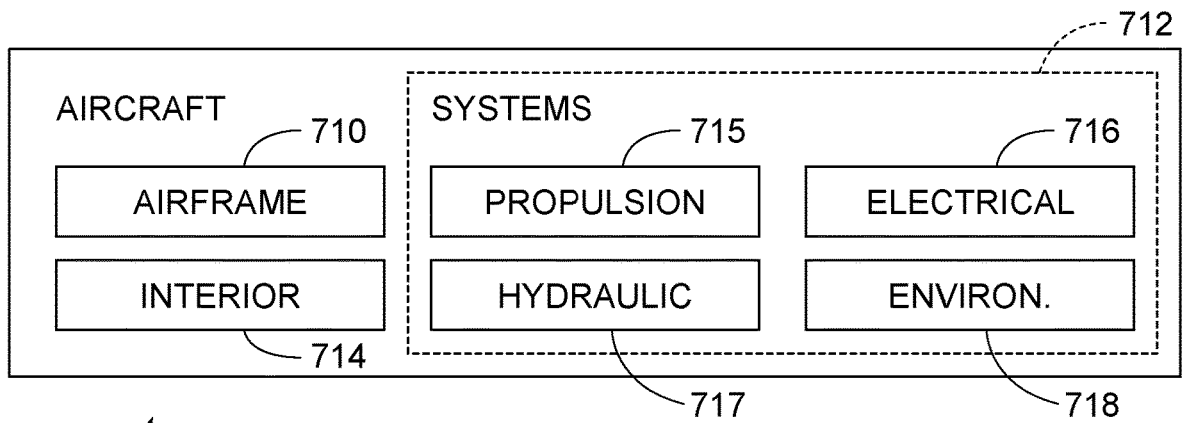
FIG. 21 is a block diagram schematically representing an aircraft.

Turning now to FIGS. 20-21, embodiments of the present disclosure may be described in the context of an aircraft manufacturing and service method 900 as shown in FIG. 20 and an aircraft 700 as shown in FIG. 21. During pre-production, exemplary method 900 may include specification and design 905 of the aircraft 700 and material procurement 910. During production, component and subassembly manufacturing 915 and system integration 920 of the aircraft 700 takes place. Thereafter, the aircraft 700 may go through certification and delivery 925 in order to be placed in service 930. While in service, the aircraft 700 is scheduled for routine maintenance and service 935 (which may also include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 21, the aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 900. For example, components or subassemblies corresponding to production process 915 may be fabricated or manufactured in a manner similar to components or subassemblies produced while the aircraft 700 is in service. Also, one or more apparatus embodiments, method embodiments, or a combination thereof may be utilized during the production stages 915 and 920, for example, by substantially expediting assembly of or reducing the cost of an aircraft 700. Similarly, one or more of apparatus embodiments, method embodiments, or a combination thereof may be utilized while the aircraft 700 is in service, for example and without limitation, to maintenance and service 935.

Illustrative, non-exclusive examples of inventive subject matter according to the present disclosure are described in the following enumerated paragraphs:

A1. A system for assembling an elongate composite structure, the system comprising:

a first rigid elongate cure tool defining a first elongate support surface configured to support a first elongate charge of composite material (FEC);

a flexible elongate caul plate extending along the first elongate support surface and configured to extend between, and spatially separate, the first elongate support surface and the FEC;

a second rigid elongate cure tool defining a second elongate support surface configured to support a second elongate charge of composite material (SEC), wherein at least a region of the second elongate support surface faces toward a corresponding region of the first elongate support surface;

a translation structure configured to permit relative translation between the first rigid elongate cure tool and the second rigid elongate cure tool from a first relative orientation, in which the FEC is spaced-apart from the SEC, and a second relative orientation, in which the FEC contacts the SEC;

a vacuum compaction film at least partially defining an enclosed volume that includes the FEC, the SEC, and the flexible elongate caul plate, wherein a region of the vacuum compaction film extends between, and spatially separates, the flexible elongate caul plate and the first elongate support surface; and a vacuum source configured to apply a vacuum to the enclosed volume.

A2. The system of paragraph A1, wherein the system further includes:

(i) a first sealing structure that operatively attaches, and forms a fluid seal between, a first edge of the vacuum compaction film and the second rigid elongate cure tool; and (ii) a second sealing structure that operatively attaches, and forms a fluid seal between, a second edge of the vacuum compaction film and the second rigid elongate cure tool.

A3. The system of paragraph A2, wherein the second elongate support surface and the vacuum compaction film together define the enclosed volume.

A4. The system of paragraph A2, wherein the first edge of the vacuum compaction film is opposed to the second edge of the vacuum compaction film.

A5. The system of paragraph A1, wherein the vacuum compaction film is a first vacuum compaction film, and further wherein the system includes:

(i) a second vacuum compaction film at least partially defining the enclosed volume;

(ii) a first sealing structure that operatively attaches, and forms a fluid seal between, a first edge of the first vacuum compaction film and the second rigid elongate cure tool;

(iii) a second sealing structure that operatively attaches, and forms a fluid seal between, a first edge of the second vacuum compaction film and the second rigid elongate cure tool; and (iv) a third sealing structure that operatively attaches, and forms a fluid seal between, the first rigid elongate cure tool and both a second edge of the first vacuum compaction film and a second edge of the second vacuum compaction film.

A6. The system of paragraph A5, wherein the second elongate support surface, the first vacuum compaction film, and the second vacuum compaction film together define the enclosed volume.

A7. The system of any of paragraphs A5-A6, wherein the first edge of the first vacuum compaction film is opposed to the second edge of the first vacuum compaction film.

A8. The system of any of paragraphs A5-A7, wherein the first edge of the second vacuum compaction film is opposed to the second edge of the second vacuum compaction film.

A9. The system of any of paragraphs A1-A8, wherein the system further includes a spacer caul extending along the second elongate support surface and configured to extend between, and spatially separate, the second elongate support surface and the SEC.

A10. The system of paragraph A9, wherein the spacer caul is positioned within the enclosed volume.

A11. The system of paragraph A1, wherein the flexible elongate caul plate is a first flexible elongate caul plate, and further wherein the system includes a second flexible elongate caul plate extending along the second elongate support surface and configured to extend between, and spatially separate, the second elongate support surface and the SEC, wherein the region of the vacuum compaction film is a first region of the vacuum compaction film, and further wherein a second region of the vacuum compaction film extends between, and spatially separates, the second flexible elongate caul plate and the second elongate support surface.

A12. The system of paragraph A11, wherein the system further includes:

a sealing structure that operatively attaches, and forms a fluid seal between, one of the first rigid elongate cure tool and the second rigid elongate cure tool and both a first edge of the vacuum compaction film and a second edge of the vacuum compaction film.

A13. The system of paragraph A12, wherein the vacuum compaction film completely, or at least substantially completely, defines the enclosed volume.

A14. The system of any of paragraphs A12-A13, wherein the first edge of the vacuum compaction film is opposed to the second edge of the vacuum compaction film.

A15. The system of paragraph A11, wherein the vacuum compaction film is a first vacuum compaction film, and wherein the system further includes:

a second vacuum compaction film at least partially defining the enclosed volume;

a first sealing structure that operatively attaches, and forms a fluid seal between, the first rigid elongate cure tool and both a first edge of the first vacuum compaction film and a first edge of the second vacuum compaction film; and a second sealing structure that operatively attaches, and forms a fluid seal between, the second rigid elongate cure tool and both a second edge of the first vacuum compaction film and a second edge of the second vacuum compaction film.

A16. The system of paragraph A15, wherein the first vacuum compaction film and the second vacuum compaction film together define the enclosed volume.

A17. The system of any of paragraphs A15-A16, wherein the first edge of the first vacuum compaction film is opposed to the second edge of the first vacuum compaction film.

A18. The system of any of paragraphs A15-A17, wherein the first edge of the second vacuum compaction film is opposed to the second edge of the second vacuum compaction film.

A19. The system of any of paragraphs A1-A18, wherein a first cure tool stiffness of the first rigid elongate cure tool is at least a threshold multiple of a caul plate stiffness of the flexible elongate caul plate, optionally wherein the threshold multiple is at least 2, at least 4, at least 6, at least 8, at least 10, at least 15, at least 20, at least 40, at least 60, at least 80, at least 100, at least 250, at least 500, and/or at least 1000.

A20. The system of any of paragraphs A1-A19, wherein a second cure tool stiffness of the second rigid elongate cure tool is at least a threshold multiple of a/the caul plate stiffness of the flexible elongate caul plate, optionally wherein the threshold multiple is at least 2, at least 4, at least 6, at least 8, at least 10, at least 15, at least 20, at least 40, at least 60, at least 80, at least 100, at least 250, at least 500, and/or at least 1000.

A21. The system of any of paragraphs A1-A20, wherein the first elongate support surface defines a first planar, or at least substantially planar, region, a second planar, or at least substantially planar, region, and a first elongate support surface transition region, which transitions between the first planar, or at least substantially planar, region and the second planar, or at least substantially planar, region.

A22. The system of paragraph A21, wherein the flexible elongate caul plate extends across at least a fraction of the first planar, or at least substantially planar, region, the second planar, or at least substantially planar, region, and the first elongate support surface transition region.

A23. The system of any of paragraphs A1-A22, wherein the system includes at least one, and optionally both, of the FEC and the SEC.

A24. The system of any of paragraphs A1-A23, wherein at least one, and optionally both, of the FEC and the SEC includes a corresponding plurality of plies of composite material.

A25. The system of paragraph A24, wherein the plurality of plies of composite material includes, is, or is defined by, a plurality of fibers and a resin material.

A26. The system of paragraph A25, wherein the resin material includes at least one of a thermoset resin, an epoxy, a thermoset epoxy, an adhesive, a thermoset adhesive, a polymer, and a thermoset polymer.

A27. The system of any of paragraphs A25-A26, wherein the plurality of fibers includes at least one of a plurality of carbon fibers, a plurality of polymeric fibers, a plurality of glass fibers, a plurality of organic fibers, a plurality of inorganic fibers, and a plurality of metallic fibers.

A28. The system of any of paragraphs A1-A27, wherein the vacuum compaction film includes, or is, at least one of a polymeric film, a polymeric sheet, a nylon sheet, flexible, compliant, a vacuum bag, fluid-impermeable, and at least substantially fluid-impermeable.

A29. The system of any of paragraphs A1-A28, wherein the FEC is formed from an FEC material, and further wherein the flexible elongate caul plate is formed from the FEC material.

A30. The system of any of paragraphs A1-A29, wherein the flexible elongate caul plate is formed from a plurality of layered plies of composite material.

A31. The system of paragraph A30, wherein the plurality of plies of composite material includes at least one of:
(i) at least 2, at least 3, at least 4, at least 6, at least 8, or at least 10 layered plies of composite material; and
(ii) at most 20, at most 18, at most 16, at most 14, at most 12, at most 10, at most 8, or at most 6 layered plies of composite material.

A32. The system of any of paragraphs A1-A31, wherein the flexible elongate caul plate is formed from at least one of a flexible material, a resilient material, a polymeric material, and a/the composite material.

A33. The system of any of paragraphs A1-A32, wherein the flexible elongate caul plate is configured to spatially separate an entirety of the first elongate support surface from an entirety of the FEC.

A34. The system of any of paragraphs A1-A33, wherein the system further includes a breather film extending between, and spatially separating, the vacuum compaction film and at least one of the FEC, the SEC, and the flexible elongate caul plate.

A35. The system of paragraph A34, wherein the breather film includes at least one of a porous breather film, a woven breather film, a polyester breather film, and a vacuum distributing breather film.

A36. The system of any of paragraphs A1-A35, wherein the system further includes a release film extending between, and spatially separating the vacuum compaction film and at least one of the FEC, the SEC, and the flexible elongate caul plate.

A37. The system of paragraph A36, wherein the release film further extends between, and spatially separates, a/the breather film and at least one of the FEC, the SEC, and the flexible elongate caul plate.

A38. The system of any of paragraphs A36-A37, wherein the release film includes at least one of a porous release film, a low surface energy release film, and a perfluoro tetrafluoroethylene (PTFE) release film.

A39. The system of any of paragraphs A1-A38, wherein the translation structure is configured to permit the relative translation along a translation axis, optionally wherein the translation axis is perpendicular to at least one, and optionally both, of the region of the second elongate support surface and the corresponding region of the first elongate support surface.

A40. The system of any of paragraphs A1-A39, wherein the vacuum source includes at least one of a vacuum pump, a blower, and a vacuum blower.

A41. The system of any of paragraphs A1-A40 in combination with a heating assembly that defines a heated volume, wherein the heated volume is sized to receive the system, and further wherein the heating assembly is configured to heat the system, via heating of the heated volume, to cure the FEC and the SEC, to join the FEC to the SEC, and to define the elongate composite structure from the FEC and the SEC.

A42. The system of paragraph A41, wherein the heating assembly includes at least one of an oven and an autoclave.

B1. A method of assembling an elongate composite structure, the method comprising:

positioning a vacuum compaction film on a first elongate support surface of a first rigid elongate cure tool;

positioning a flexible elongate caul plate on the first elongate support surface such that the vacuum compaction film extends between, and spatially separates, the flexible elongate caul plate and the first elongate support surface;

positioning a first elongate charge of composite material (FEC) on the first elongate support surface such that the vacuum compaction film and the flexible elongate caul plate extend between, and spatially separate, the FEC and the first elongate support surface;

positioning a second elongate charge of composite material (SEC) on a second elongate support surface of a second rigid elongate cure tool;

contacting a region of the FEC with a region of the SEC to define an interface region between the FEC and the SEC;

sealing the vacuum compaction film against at least one of the first elongate support surface and the second elongate support surface to at least partially define an enclosed volume that includes the FEC, the SEC, and the flexible elongate caul plate;

evacuating the enclosed volume to compact the FEC and the SEC, to press the FEC and the SEC against one another, and to generate an elongate composite assembly that includes the FEC, the SEC, the vacuum compaction film, the first elongate cure tool, and the second elongate cure tool; and heating the elongate composite assembly to cure the FEC and the SEC, to join the FEC to the SEC within the interface region, and to define the elongate composite structure from the FEC and the SEC.

B2. The method of paragraph B1, wherein the sealing the vacuum compaction film includes sealing a first edge of the vacuum compaction film against the second rigid elongate cure tool and sealing a second edge of the vacuum compaction film against the second rigid elongate cure tool such that the vacuum compaction film and the second elongate support surface together define the enclosed volume.

B3. The method of paragraph B1, wherein the vacuum compaction film is a first vacuum compaction film, wherein the sealing the first vacuum compaction film includes sealing a first edge of the first vacuum compaction film against the second rigid elongate cure tool and sealing a second edge of the first vacuum compaction film against the first rigid elongate cure tool, and further wherein the method includes sealing a first edge of a second vacuum compaction film against the second rigid elongate cure tool and sealing a second edge of the second vacuum compaction film against the first rigid elongate cure tool such that the first vacuum compaction film, the second vacuum compaction film, and the second elongate support surface together define the enclosed volume.

B4. The method of paragraph B1, wherein the flexible elongate caul plate is a first flexible elongate caul plate, and further wherein the method includes:

prior to the positioning the SEC, positioning the vacuum compaction film on the second elongate support surface; and prior to the positioning the SEC and subsequent to the positioning the vacuum compaction film on the second elongate support surface, positioning a second flexible elongate caul plate on the second elongate support surface such that the vacuum compaction film extends between, and spatially separates, the second flexible elongate caul plate and the second elongate support surface, wherein the positioning the SEC includes positioning the SEC such that both the vacuum compaction film and the second elongate caul plate extend between, and spatially separate, the SEC and the second elongate support surface.

B5. The method of paragraph B4, wherein the sealing the vacuum compaction film includes sealing both a first edge of the vacuum compaction film and a second edge of the vacuum compaction film against a selected one of the first elongate support surface and the second elongate support surface.

B6. The method of paragraph B4, wherein the vacuum compaction film is a first vacuum compaction film, and further wherein:

the sealing the first vacuum compaction film includes sealing a first edge of the first vacuum compaction film against the first elongate support surface and sealing a second edge of the first vacuum compaction film against the second elongate support surface; and the method further includes sealing a first edge of a second vacuum compaction film against the first elongate support surface and sealing a second edge of the second vacuum compaction film against the second elongate support surface such that the first vacuum compaction film and the second vacuum compaction film together define the enclosed volume.

B7. The method of any of paragraphs B1-B6, wherein, subsequent to the contacting, the FEC and the SEC define an arcuate transition region therebetween, and further wherein, subsequent to the contacting and prior to the sealing, the method further includes positioning a radius filler within the arcuate transition region.

B8. The method of any of paragraphs B1-B7, wherein, subsequent to the contacting, the FEC and the SEC together define an exposed surface, and further wherein, prior to the sealing, the method further includes positioning a base charge on the exposed surface.

B9. The method of paragraph B8, wherein, subsequent to the positioning the base charge, the method further includes positioning a peel ply on the base charge.

B10. The method of paragraph B9, wherein, subsequent to the positioning the peel ply, the method further includes positioning a peel ply caul plate on the peel ply.

B11. The method of any of paragraphs B1-B10, wherein, subsequent to the heating, the method further includes separating the first rigid elongate cure tool, the second rigid elongate cure tool, and the vacuum compaction film from the elongate composite structure.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A system for assembling an elongate composite structure, the system comprising:
   a first rigid elongate cure tool defining a first elongate support surface configured to support a first elongate charge of composite material (FEC);
   a caul plate extending along the first elongate support surface and configured to extend between, and spatially separate, the first elongate support surface and the FEC, wherein the caul plate is formed from a plurality of layered plies of composite material;
   a second rigid elongate cure tool defining a second elongate support surface configured to support a second elongate charge of composite material (SEC), wherein at least a region of the second elongate support surface faces toward a corresponding region of the first elongate support surface, wherein the second elongate support surface defines an at least substantially vertical region, which faces toward the corresponding region of the first elongate support surface, an at least substantially horizontal region, and a transition region that extends between the at least substantially vertical region and the at least substantially horizontal region;
   a translation structure that produces relative translation between the first rigid elongate cure tool and the second rigid elongate cure tool along a translation axis and between a first relative orientation, in which the FEC is spaced-apart from the SEC, and a second relative orientation, in which the FEC contacts the SEC to define an interface region between the FEC and the SEC;
   a vacuum compaction film at least partially defining an enclosed volume that includes the FEC, the SEC, and the caul plate, wherein a region of the vacuum compaction film extends between, and spatially separates, the caul plate and the first elongate support surface;
   a sealing structure that operatively attaches, and forms a fluid seal between, the vacuum compaction film and the at least substantially horizontal region; and
   a vacuum source configured to apply a vacuum to the enclosed volume.

2. The system of claim 1, wherein the sealing structure is a first sealing structure, wherein the fluid seal is a first fluid seal, wherein the first sealing structure forms the first fluid seal between a first edge of the vacuum compaction film and the at least substantially horizontal region of the second rigid elongate cure tool, and further wherein the system includes:
   a second sealing structure that operatively attaches, and forms a second fluid seal between, a second edge of the vacuum compaction film and the second rigid elongate cure tool;
   wherein the first edge of the vacuum compaction film is opposed to the second edge of the vacuum compaction film.

3. The system of claim 2, wherein the second elongate support surface and the vacuum compaction film together define the enclosed volume.

4. The system of claim 1, wherein the vacuum compaction film is a first vacuum compaction film, wherein the sealing structure is a first sealing structure, wherein the fluid seal is a first fluid seal, wherein the first sealing structure operatively attaches, and forms the first fluid seal, between a first edge of the first vacuum compaction film and the at least substantially horizontal region of the second rigid elongate cure tool, and further wherein the system includes:
   (i) a second vacuum compaction film at least partially defining the enclosed volume;
   (ii) a second sealing structure that operatively attaches, and forms a second fluid seal between, a first edge of the second vacuum compaction film and the second rigid elongate cure tool; and (iii) a third sealing structure that operatively attaches, and forms a third fluid seal between, the first rigid elongate cure tool and both a second edge of the first vacuum compaction film and a second edge of the second vacuum compaction film.

5. The system of claim 1, wherein the caul plate is a first caul plate, and further wherein the system includes a second caul plate extending along the second elongate support surface and configured to extend between, and spatially separate, the second elongate support surface and the SEC, wherein the region of the vacuum compaction film is a first region of the vacuum compaction film, and further wherein a second region of the vacuum compaction film extends between, and spatially separates, the second caul plate and the second elongate support surface.

6. The system of claim 5, wherein the vacuum compaction film is a first vacuum compaction film, wherein the sealing structure is a second sealing structure, wherein the fluid seal is a second fluid seal, wherein the second sealing structure operatively attaches, and forms the second fluid seal, between a second edge of the first vacuum compaction film and the at least substantially horizontal region of the second rigid elongate cure tool, and further wherein the system includes:

a second vacuum compaction film at least partially defining the enclosed volume, wherein the second sealing structure also operatively attaches, and forms the second fluid seal between, the second rigid elongate cure tool and a second edge of the second vacuum compaction film; and a first sealing structure that operatively attaches, and forms a first fluid seal between, the first rigid elongate cure tool and both a first edge of the first vacuum compaction film and a first edge of the second vacuum compaction film.

7. The system of claim 1, wherein the first rigid elongate cure tool has a first cure tool stiffness, wherein the second rigid elongate cure tool has a second cure tool stiffness, wherein the caul plate has a caul plate stiffness, wherein each of the first cure tool stiffness and the second cure tool stiffness is at least a threshold multiplier of the caul plate stiffness, and wherein the threshold multiplier is at least 100.

8. The system of claim 1, wherein the first elongate support surface defines a first planar region, a second planar region, and a first elongate support surface transition region, which transitions between the first planar region and the second planar region, and wherein the caul plate extends across at least a fraction of the first planar region, the second planar region, and the first elongate support surface transition region.

9. The system of claim 2, wherein each of the FEC and the SEC includes a corresponding plurality of plies of composite material that includes a plurality of fibers and a resin material.

10. The system of claim 1, wherein the caul plate is configured to spatially separate an entirety of the first elongate support surface from an entirety of the FEC.

11. The system of claim 1 in combination with a heating assembly that defines a heated volume, wherein the heated volume is sized to receive the system, wherein the heating assembly is configured to heat the system, via heating of the heated volume, to cure the FEC and the SEC, to join the FEC to the SEC, and to define the elongate composite structure from the FEC and the SEC, and further wherein the heating assembly includes at least one of an oven and an autoclave.

12. The system of claim 1, wherein:
the system includes the FEC, wherein the FEC is supported by the first elongate support surface; and
the system includes the SEC, wherein the SEC is supported by the second elongate support surface.

13. The system of claim 1, wherein the translation axis is at least substantially perpendicular to the region of the second elongate support surface that faces toward the corresponding region of the first elongate support surface.

14. The system of claim 1, wherein the plurality of layered plies of composite material includes at least 3 layered plies of composite material.

15. The system of claim 1, wherein the plurality of layered plies of composite material includes at most 8 layered plies of composite material.

16. The system of claim 1, wherein the caul plate is formed from the same material as the FEC.

17. The system of claim 16, wherein the caul plate and the FEC both are formed from at least one of:
(i) pre-impregnated composite fibers;
(ii) resin-infused fiber structures; and
(iii) thermoplastic fiber reinforced materials.

18. The system of claim 1, wherein the caul plate defines a caul plate stiffness that selectively varies along a length of the plurality of layered plies that comprises the caul plate to apply a specific pressure to the FEC at specific locations along the length of the FEC.

19. The system of claim 1, wherein the vacuum compaction film completely defines the enclosed volume.

20. The system of claim 1, wherein the vacuum compaction film extends between, and spatially separates, the SEC and the second elongate support surface.

21. The system of claim 1, wherein the caul plate consists of the plurality of layered plies of composite material.

22. The system of claim 1, wherein the translation axis is perpendicular to the region of the second elongate support surface that faces toward the corresponding region of the first elongate support surface.

* * * * *